US012647870B2

(12) United States Patent
    Rofougaran et al.

(10) Patent No.: US 12,647,870 B2
(45) Date of Patent: *Jun. 2, 2026

(54) SYSTEM AND METHOD FOR TELEMETRY INFORMATION-BASED NETWORK ROLE REASSIGNMENTS IN WIRELESS BACKHAUL MESH NETWORK

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Coast, CA (US); Milan Rofougaran, Newport Coast, CA (US); Kavian Odabaee, Newport Coast, CA (US); Puya Rofougaran, Irvine, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/358,773

(22) Filed: Oct. 15, 2025

(65) Prior Publication Data

US 2026/0075499 A1 Mar. 12, 2026

Related U.S. Application Data

(63) Continuation of application No. 19/058,060, filed on Feb. 20, 2025, now Pat. No. 12,470,998, which is a (Continued)

(51) Int. Cl.
| | |
|---|---|
| *H04W 40/14* | (2009.01) |
| *H04W 40/24* | (2009.01) |
| *H04W 40/34* | (2009.01) |

(52) U.S. Cl.
CPC ........... *H04W 40/14* (2013.01); *H04W 40/24* (2013.01); *H04W 40/34* (2013.01)

(58) Field of Classification Search
CPC ...... H04W 40/14; H04W 40/24; H04W 40/34
See application file for complete search history.

(56) References Cited

U.S. PATENT DOCUMENTS 10,694,559 B2 * 6/2020 Stauffer ................ H04W 24/08
11,166,222 B2 * 11/2021 Tarighat Mehrabani ....................
H04W 28/0263

(Continued)

OTHER PUBLICATIONS

Non-Final Office Action for U.S. Appl. No. 19/058,060, dated Apr. 15, 2025.

(Continued)

*Primary Examiner* — Liton Miah
(74) *Attorney, Agent, or Firm* — CHIP LAW GROUP

(57) ABSTRACT

A wireless communication system includes a central cloud server that obtains a first type of telemetry information from a plurality of hybrid analog-digital repeater devices and a second type of telemetry information from a master wireless access point device and service wireless access point devices. The central cloud server determines one or more intra-node radio frequency (RF) beam parameters and one or more inter-node RF beam parameters for each of the plurality of hybrid analog-digital repeater devices based on the first type of telemetry information and the second type of telemetry information, causes the plurality of hybrid analog-digital repeater devices to dynamically form a wireless backhaul mesh network among the master WAP device, the plurality of hybrid analog-digital repeater devices, and the one or more service WAP devices, and causes the plurality of hybrid analog-digital repeater devices to establish one or more analog data propagation paths in the wireless backhaul mesh network in one or more intermediate frequencies.

20 Claims, 12 Drawing Sheets

Related U.S. Application Data continuation of application No. 18/829,905, filed on Sep. 10, 2024, now Pat. No. 12,262,300.

(56)                    References Cited

U.S. PATENT DOCUMENTS

| | | | |
|---|---|---|---|
| 12,126,426 | B1 | 10/2024 | Rofougaran et al. |
| 12,213,037 | B2 * | 1/2025 | Lekutai ................. H04W 12/08 |
| 12,261,675 | B1 | 3/2025 | Rofougaran et al. |
| 2011/0110277 | A1 | 5/2011 | Rausch |
| 2014/0256328 | A1 | 9/2014 | Li et al. |
| 2015/0237537 | A1 * | 8/2015 | Stimpson .......... H04W 36/0085 370/331 |
| 2016/0099852 | A1 | 4/2016 | Cook et al. |
| 2016/0259028 | A1 | 9/2016 | High et al. |
| 2019/0052351 | A1 | 2/2019 | Fujimura |
| 2019/0109635 | A1 | 4/2019 | Buer et al. |
| 2020/0052997 | A1 | 2/2020 | Ramanathan et al. |
| 2021/0037447 | A1 | 2/2021 | Tarighat Mehrabani |
| 2023/0138574 | A1 | 5/2023 | Kalkunte et al. |

OTHER PUBLICATIONS

Notice of Allowance for U.S. Appl. No. 18/829,905, dated Nov. 20, 2024.
Notice of Allowance for U.S. Appl. No. 19/058,060, dated Jul. 31, 2025.

* cited by examiner

700

Obtain a first type of telemetry information from a plurality of hybrid analog-digital repeater devices 702

Obtain a second type of telemetry information from a master wireless access point device and one or more service wireless access point devices 704

Assign a different weightage to the first type of telemetry information obtained from the plurality of hybrid analog-digital repeater devices with respect to the second type of telemetry information obtained from the master wireless access point device and the one or more service wireless access point devices in determination of one or more intra-node RF beam parameters and one or more inter-node RF beam parameters 706

Determine one or more intra-node radio frequency (RF) beam parameters and one or more inter-node RF beam parameters for each of the plurality of hybrid analog-digital repeater devices based on the first type of telemetry information and the second type of telemetry information, wherein the plurality of hybrid analog-digital repeater devices are disposed as a RF bridge between the master wireless access point device and the one or more service wireless access point devices 708

Cause the plurality of hybrid analog-digital repeater devices to dynamically form a wireless backhaul mesh network among the master wireless access point device, the plurality of hybrid analog-digital repeater devices and the one or more service wireless access point devices, based on the determined one or more intra-node RF beam parameters and the one or more inter-node RF beam parameters 710

Cause the plurality of hybrid analog-digital repeater devices to establish one or more analog data propagation paths in the wireless backhaul mesh network in one or more intermediate frequencies 712

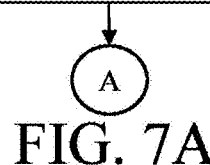

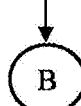

Cause the plurality of hybrid analog-digital repeater devices to establish a backchannel network in a control plane in the wireless backhaul mesh network via a wireless local area network (WLAN) frequency less than the one or more intermediate frequencies 714

Predict a potential network node failure or the performance degradation beyond the defined threshold among the plurality of network nodes before its occurrence in the wireless backhaul mesh network 716

Based on the first type of telemetry information and the second type of telemetry information, detect a performance degradation beyond a defined threshold of the master wireless access point device operating in a primary gateway role in the wireless backhaul mesh network for providing internet connectivity and routing traffic in the wireless backhaul mesh network 718

Elect a new master wireless access point device from a plurality of network nodes in the wireless backhaul mesh network based on one or more defined election criteria when the performance degradation is detected beyond the defined threshold, wherein the new master wireless access point device previously operating in a network role different from the primary gateway role in the wireless backhaul mesh network is switched to operate in the primary gateway role 720

Reassign one or more network nodes previously connected to the master wireless access point device to corresponding neighboring network nodes 722

FIG. 7B

B

Re-configure the wireless backhaul mesh network based on the elected new master wireless access point device and the reassigned one or more network nodes to maintain an uninterrupted network connectivity and minimize disruptions to one or more user equipment (UEs) served in the wireless backhaul mesh network 724

Change a role assignment of a first hybrid analog-digital repeater of the plurality of hybrid analog-digital repeater devices from a first network role to a second network role among a plurality of defined network roles in the wireless backhaul mesh network 726

Communicate a first role reassignment instruction set to the first hybrid analog-digital repeater configured as a switch node in a switch node role to switch operation from the switch node role to an access node role based on the one or more defined election criteria 726A Communicate a second role reassignment instruction set to the first hybrid analog-digital repeater configured as a switch node in a switch node role to switch operation from the switch node role to a root node role 726B Propagate a self-healing instruction set to a set of network nodes predicted for the potential network node failure or the performance degradation beyond the defined threshold, wherein the self-healing instruction set comprises detection and self-recovery instructions to proactively prevent or reduce the performance degradation in the set of network nodes 728

Periodically execute a distributed self-healing operation in which an intra-node self-healing induction and an inter-node self-healing instruction is communicated to each network node of the plurality of network nodes to cause each network node of the plurality of network nodes to cross-talk and coordinate with each other to detect and resolve the performance degradation at each network node or a neighboring network node independent of the central cloud server 730

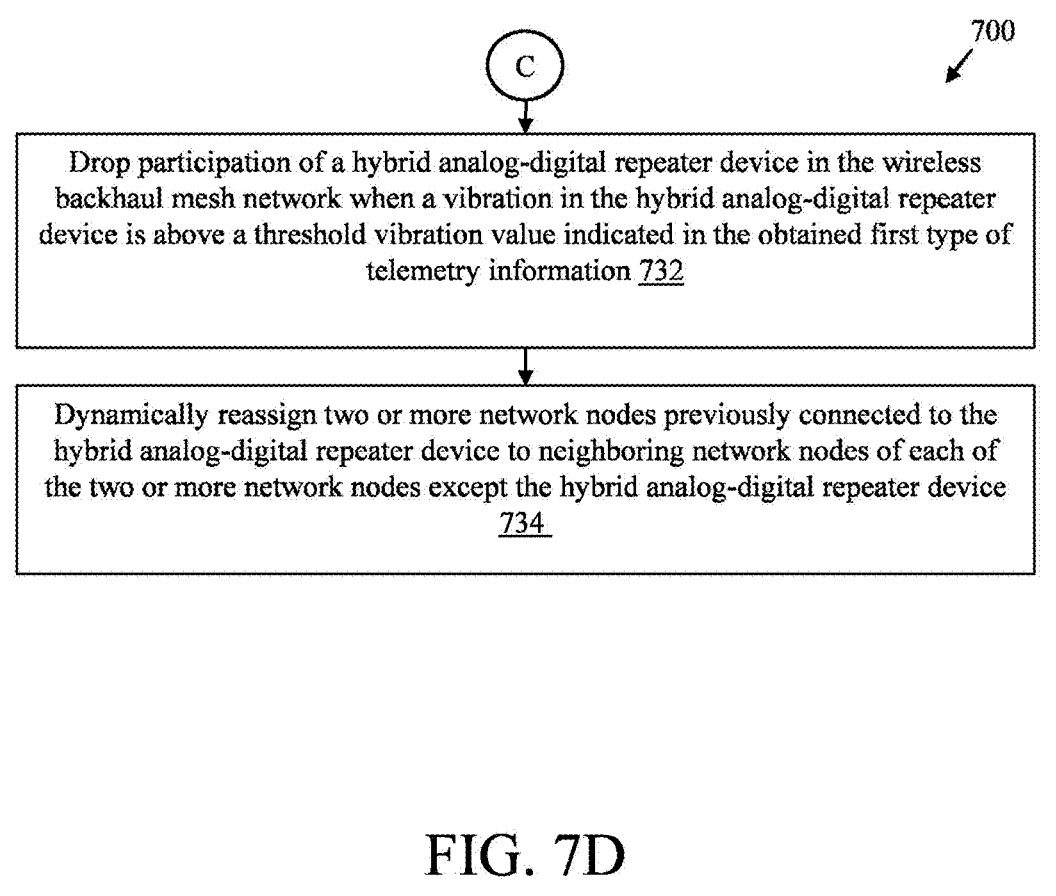

Drop participation of a hybrid analog-digital repeater device in the wireless backhaul mesh network when a vibration in the hybrid analog-digital repeater device is above a threshold vibration value indicated in the obtained first type of telemetry information 732

Dynamically reassign two or more network nodes previously connected to the hybrid analog-digital repeater device to neighboring network nodes of each of the two or more network nodes except the hybrid analog-digital repeater device 734

FIG. 7D

SYSTEM AND METHOD FOR TELEMETRY INFORMATION-BASED NETWORK ROLE REASSIGNMENTS IN WIRELESS BACKHAUL MESH NETWORK

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 19/058,060 filed on Feb. 20, 2025, which is a Continuation Application of U.S. Pat. No. 12,262,300 issued on Mar. 25, 2025. Each of the above-referenced application is hereby incorporated herein by reference in its entirety.

FIELD OF TECHNOLOGY

Certain embodiments of the disclosure relate to a wireless communication system in a wireless backhaul mesh network. More specifically, certain embodiments of the disclosure relate to a wireless communication system and a method for telemetry information-based network role reassignments (e.g., dynamic network role reassignments based on different types of telemetry information from different types of network nodes) in a wireless backhaul mesh network for high-performance, low latency, and ultra-reliable communication.

BACKGROUND

Conventional communication devices, such as wireless access points (WAPs), are often used to extend the wireless coverage of an existing Wi-Fi signal to access the Internet and to increase the number of end-user devices capable of using Wi-Fi® may connect to the WAPs. However, Wi-Fi® signals, under the limitation of the Wi-Fi® communication protocol, have a defined range beyond which the connectivity is lost. Thus, many WAPs or range extenders are used if wireless coverage for Wi-Fi® signals is to be extended. Moreover, under ideal conditions, typically, 2.4 GHz Wi-Fi® supports up to 450 Mbps or 600 Mbps, and 5 GHz Wi-Fi® supports up to 1300 Mbps. Thus, the data transmission over such narrow bandwidth is much lower than higher radio frequencies.

The emergence of fifth generation (5G) technology standards for cellular networks has unleashed unprecedented possibilities across industries fueled by multi-gigabit speeds, massive capacity, and low latency. However, prohibitive infrastructure costs have challenged full-scale realization. Legacy wireless systems also face inconsistencies around throughput, resilience, and complexity. This necessitates carrier-grade wireless connectivity to deliver fiber-like consistency combined with agile, scalable deployment models. Furthermore, latency and signal noise are other technical problems with existing wireless communication systems and network architecture. Such latency increases when more wireless access points or relay nodes are introduced to extend the communication range. Furthermore, in traditional Wi-Fi® mesh systems, the main node, often referred to as the primary router or gateway, is a critical component. It serves as the initial access point to the broader internet and orchestrates the network's communication. However, this creates a single point of failure, i.e., if the main node fails, the entire network can be compromised.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication system and a method for telemetry information-based network role reassignments in a wireless backhaul mesh network for high-performance, low latency, and ultra reliable communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF DRAWINGS

FIGS. 7A, 7B, 7C, and 7D, collectively, is a flowchart of a method for telemetry information-based network role reassignments in a wireless backhaul mesh network for high-performance, low latency, and ultra-reliable communication, in accordance with an embodiment of the disclosure.

DETAILED DESCRIPTION OF THE DISCLOSURE

Certain embodiments of the disclosure may be found in a wireless communication system and a method for telemetry information-based network role reassignments (e.g., dynamic network role reassignments based on several types of telemetry information from different types of network nodes) in a wireless backhaul mesh network for high-performance, low latency, and ultra-reliable communication.

In traditional Wi-Fi® mesh systems, a primary node, often referred to as the primary router or gateway, may serve as the initial access point to the broader internet and may control or route the network's communication. However, this may create a single point of failure: if the primary node fails, the entire network can be compromised. To mitigate this risk, in the present disclosure, the wireless communication system 100A employs advanced wireless backhaul mesh network configurations and operations for dynamic reassignment of network roles and responsibilities. Furthermore, the wireless communication system improves quality of service (QoS) metrics such as high throughput and sub-millisecond latency to meet 5G application needs. The wireless communication system ensures predictive resilience where automated failure analysis and predictive adaptation significantly minimize network outages. By leveraging the first type of telemetry information and the second type of telemetry information, the central cloud server enables wireless backhaul optimization and resilience to accelerate 5G or 6G adoption. The wireless communication system includes a plurality of hybrid analog-digital repeater devices, which may be primarily analog repeater devices where the data propagation path in the wireless communication system is analog with some digital processing may be performed for external network control, for example, by the central cloud server, and thus may be referred to as hybrid analog-digital repeater devices. The wireless communication system and method of the present disclosure not only improves data transfer rates between at least two communication devices as compared to existing wireless systems (e.g. conventional wireless local area networks (WLANs), Wi-Fi® systems, or traditional Wi-Fi® mesh networks) but also enables almost near zero latency communication and an always-connected experience.

In the following description, reference is made to the accompanying drawings, which form a part hereof, and in which are shown, by way of illustration, various embodiments of the present disclosure.

Figure 1A:
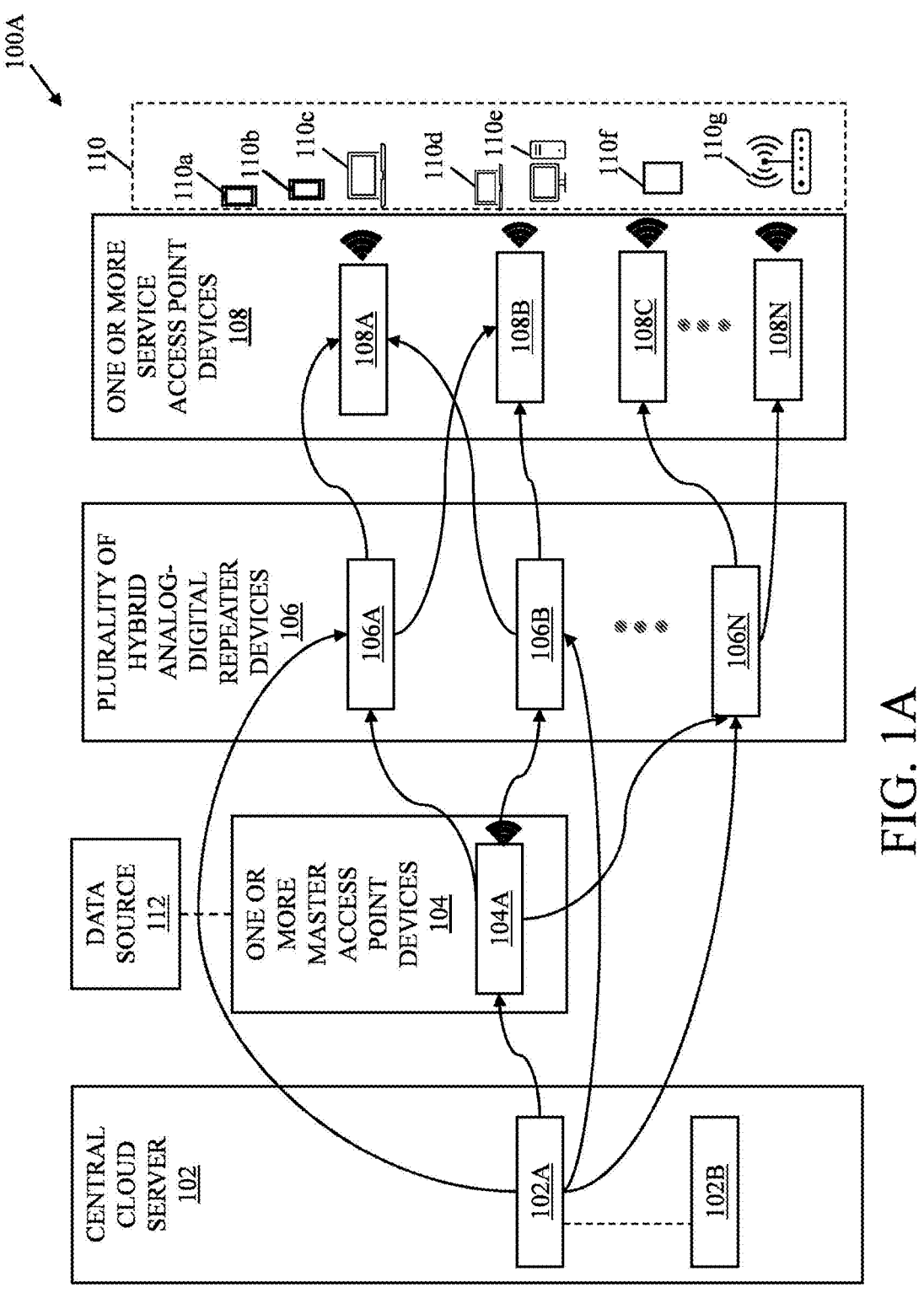
FIG. 1A is a diagram that illustrates an exemplary wireless communication system for telemetry information-based network role reassignments in a wireless backhaul mesh network, in accordance with an exemplary embodiment of the disclosure.

FIG. 1A is a diagram that illustrates an exemplary wireless communication system for telemetry information-based network role reassignments in a wireless backhaul mesh network, in accordance with an exemplary embodiment of the disclosure. With reference to FIG. 1A, there is shown a wireless communication system 100A. The wireless communication system 100A may include a central cloud server 102, one or more master Wireless Access Point (WAP) devices 104, a plurality of hybrid analog-digital repeater devices 106, and one or more service WAP devices 108. There is further shown one or more user equipment (UEs) 110 (e.g., UEs 110a to 110g) and a data source 112. The central cloud server 102 may include one or more processors, such as the processor 102A, and a neural network model 102B. The one or more master WAP devices 104, the plurality of hybrid analog-digital repeater devices 106, and the one or more service WAP devices 108 may be collectively referred to as a plurality of network nodes of a wireless backhaul mesh network of the wireless communication system 100A.

The central cloud server 102 includes suitable logic, circuitry, and interfaces that may be configured to communicate with the one or more master WAP devices 104 and the plurality of hybrid analog-digital repeater devices 106. In an implementation, the central cloud server 102 may be communicatively coupled to each network node (e.g., communicatively coupled to the one or more service WAP devices 108 and the one or more UEs 110). In an example, the central cloud server 102 may be a remote management server that is managed by a third party different from the service providers associated with the plurality of different wireless carrier networks (WCNs). In another example, the central cloud server 102 may be a remote management server or a data center that is managed by a third party, or jointly managed, or managed in coordination and association with one or more of the plurality of different WCNs.

The processor 102A may be further configured to cause each network node of the wireless communication system 100A to determine location information of a plurality of neighboring nodes around each network node. Each network node may determine its geo-location and the geo-location of the neighboring nodes. In an implementation, each of the plurality of hybrid analog-digital repeater devices 106 may further comprise a position sensor (e.g., a gyroscope) or a location sensor (e.g., a global positioning system (GPS) sensor or other geospatial location sensor). In another implementation, each network node may further include Wi-Fi capability, which may be used, for example, to determine its location coordinates or location coordinates of neighboring nodes (e.g., nearby mesh nodes) by received signal strength indication (RSSI)-based triangulation or WI-FI®-based triangulation process, known in the art. Examples of the processor 102A of the central cloud server 102 may include but are not limited to a central processing unit (CPU), graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The neural network model 102B of the central cloud server 102 may be periodically (e.g., daily and for different times-of-day) trained on data points (e.g., different types of telemetry information) uploaded to the central cloud server 102 by each network node, such as the one or more master WAP devices 104, the plurality of hybrid analog-digital repeater devices 106, and the one or more service WAP devices 108.

The one or more master WAP devices 104 includes suitable logic, circuitry, and interfaces that may be configured to provide access to the Internet or wireless backhaul in 5G or 6G networks. Examples of the one or more master WAP devices 104 may include, but is not limited to a home gateway device, a 5G wireless access point, a wireless router, a fifth generation (5G) modem, a backplane system, an evolved-universal terrestrial radio access-new radio (NR) dual connectivity (EN-DC) device, an advanced router, a bridge router, a network controller, a fixed wireless access (FWA) device, a firewall device, or a network security device, or one or more combinations thereof.

The plurality of hybrid analog-digital repeater devices 106 may be disposed as a radio frequency (RF) bridge between the master WAP device 104A and the one or more service WAP devices 108 such that a data propagation path of user data relayed through a network of the plurality of hybrid analog-digital repeater devices 106 may be analog without any digital decoding or encoding of the user data in a RF signal to reduce latency less than a threshold time. For example, the data propagation path may comprise high-frequency analog circuitry to minimize latency to nanoseconds. Multi-hop relaying of intermediate frequency signals (e.g. mmWave signals) may happen without any digital encoding or decoding of the user data (i.e., payload). Further, a backchannel connectivity and control of the network of the plurality of hybrid analog-digital repeater devices 106 may be via a lower WLAN frequency (e.g., 2.4 GHz or 5 Ghz of Wi-Fi® 7 or 8), based on a signal metadata of the incoming RF signal. While the data propagation path may remain entirely analog for lowest latency, the plurality of hybrid analog-digital repeater devices 106 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture. The plurality of hybrid analog-digital repeater devices 106 extends the coverage area of the master WAP device 104A and one or more service WAP devices 108, allowing them to serve its corresponding UEs in areas that may have poor signal reception.

The one or more service WAP devices 108 may be configured to receive a beam of RF signals in the intermediate frequency band (e.g., mmWave frequency or intermediate frequency in range of 10-300 GHz) from the one or more second hybrid analog-digital repeater devices (e.g., the hybrid analog-digital repeater devices 106B to 106N) and convert back to the WLAN signal to serve one or more UEs 110 in a data throughput greater than a threshold throughput. Each of the master WAP device 104A and the one or more service WAP devices 108 may be configured to perform Multi-User, Multiple Input, Multiple Output (Mu-MIMO) to corresponding connected UEs via corresponding mmWave New Radio Unlicensed (NR-U) links. The use of intermediate frequencies (e.g., millimeter-wave frequencies) and Mu-MIMO together may provide high data rates and efficient use of the available spectrum.

Each of one or more UEs 110 may correspond to a wireless device, such as a client device or a telecommunication hardware used by an end-user to communicate. Some of the one or more UEs 110 may refer to a combination of a mobile equipment and subscriber identity module (SIM). Examples of the one or more UEs 110 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

In an implementation, the data source 112 of the master WAP device 104A may be one or more of an optical fiber port connected to an optical fiber for an Internet connection, an Ethernet port connected to an Ethernet cable for the Internet connection, or a 5G or 6G mmWave cellular signal received from a radio access network (RAN) node.

Currently, in WLAN technology, the 2.4 GHz and 5 GHz frequency bands are unlicensed spectrums that limited and congested and when running high-bandwidth applications, existing Wi-Fi networks inevitably encounter low quality of service (QoS). More advanced WLAN technology, like the IEEE 802.11be (Wi-Fi® 7) is being developed with higher data rate capability, such as theoretical capacity of up to 30 Gbps (e.g., assuming ideal conditions like clear line-of-sight, single user, and no interference) while 5-10 Gbps is a more realistic expectation in practical scenarios. There are many factors affecting practical capacity, such as signal interference from nearby devices, appliances, and even weather can disrupt signals, reducing throughput. In another example, distance from access point is also another factor where signal strength weakens with distance, impacting achievable speeds. In yet another example, sharing bandwidth among multiple users reduces individual speeds. One of the main objectives of Wi-Fi® 7 is to make full use of up to 1.2 GHz spectrum resources in the 6 GHz band. However, it is increasingly becoming evident that to effectively utilize these frequency resources, Wi-Fi® 7 or more advanced WLAN technologies may have to coexist with other different technologies operating in the same band, such as IEEE 802.11ax (or IEEE 802.11be) and 5G on the unlicensed band. Coexistence among wireless networks is challenging, especially when these networks are heterogeneous. Densely deployed sub-6 or 6-7.125 GHz WLANs alone may not provide the seamless connectivity required by mobile services and the rapid increase in mobile data traffic in future wireless networks. As a result, one of the main advancements in the network design for WLAN relies on integrating multiple different bands (e.g., microwave and mmWave). Wireless mesh networks (WMNs) are anticipated to resolve the limitations and to significantly improve the performance of ad hoc networks, wireless local area networks (WLANs), wireless personal area networks (WPANs), and wireless metropolitan area networks (WMANs). However, legacy wireless systems face inconsistencies around throughput, resilience, and complexity, where latency and signal noise are other technical problems with existing wireless communication systems and network architecture. Such latency increases when more wireless access points or relay nodes are introduced in the network to extend the communication range. Further, collision avoidance in wireless networks is a significant problem, especially with traditional wireless mesh networks and WLAN systems. Typically, collisions occur when multiple devices attempt to transmit data simultaneously on a shared wireless channel, resulting in corrupted data and reduced network performance.

In contrast to the conventional systems, in the present disclosure, the wireless communication system 100A intelligently balances the simplicity and low latency of analog signal relaying with the flexibility and intelligence of digital processing in a hybrid architecture. This hybrid approach allows to achieve not only the low latency and high efficiency of analog signal relaying but also the flexibility and programmability of digital signal processing. The wireless communication system 100A of the present disclosure not only improves data transfer rates between at least two communication devices as compared to existing wireless systems (e.g. conventional wireless local area networks (WLANs), Wi-Fi® systems, or traditional Wi-Fi® mesh networks) but also enables almost near zero latency communication with significantly reduced interference, almost zero-collision and an always-connected experience.

Beneficially, the central cloud server 102 may be configured to obtain different types of telemetry information from different types of devices. For example, a first type of telemetry information from the plurality of hybrid analog-digital repeater devices 106 and a second type of telemetry information from the wireless access point (WAP) devices, such as the master WAP device 104A and the one or more service WAP devices 108. Each of the plurality of hybrid analog-digital repeater devices 106 may include a set of onboard sensors, which may capture sensor data to enrich each analog hybrid analog-digital repeater device with environmental awareness for intelligent intra-node and inter-node optimizations. The second type of telemetry information may be different from the first type of telemetry information. The first type of telemetry information may be related to the state of the repeater devices themselves (i.e. performance of the plurality of hybrid analog-digital repeater devices 106), whereas the second type of telemetry information may be related to the performance metrics and characteristics of the end user devices connected to the WAP devices (the master WAP device 104A and the one or more service WAP devices 108 in the network, providing insights into the user experience. The central cloud server 102 may be further configured to form a wireless backhaul mesh network based on the first type of telemetry information and the second type of telemetry information, for example, to route traffic over the high-performance links maximizing capacity, range and resilience compared to rigid deployments. The operations of the central cloud server 102 are described in detail with respect to dynamic network role reassignments based on different types of telemetry information from different types of network nodes in a wireless backhaul mesh network for high-performance, low latency, and ultra reliable communication, for example, in FIG. 5.

In accordance with an embodiment, the plurality of hybrid analog-digital repeater devices 106 may be disposed at a plurality of different locations. A first hybrid analog-digital repeater device (e.g., the hybrid analog-digital repeater device 106A) may be configured to receive the WLAN signal from the master WAP device 104A. The first hybrid analog-digital repeater device (e.g., the hybrid analog-digital repeater device 106A) may be configured to convert the WLAN signal to a first beam of radio frequency (RF) signal in an intermediate frequency band and may further relay the first beam of RF signals in the intermediate frequency band to one or more second hybrid analog-digital repeater devices (e.g., the hybrid analog-digital repeater devices 106B and 106N) of the plurality of hybrid analog-digital repeater devices 106 under the control of the central cloud server 102. The first hybrid analog-digital repeater device (e.g., the hybrid analog-digital repeater device 106A) may be also referred to as a root node that may interface the master WAP device 104A (i.e., the WAP source) and convert the first WLAN signal into intermediate frequency (IF, which may also be referred to as an Internal Frequency) for a beam mesh downstream. Each of the plurality of hybrid analog-digital repeater devices 106 may be equipped with amplifiers (e.g., power amplifiers) and phase shifters (not shown), which enhances the first WLAN signal received from the master WAP device 104A and relay it over longer distances.

The one or more service WAP devices 108 may be configured to receive the first beam of RF signals in the intermediate frequency band (e.g., mmWave frequency or intermediate frequency in the range of 10-300 GHz) from the one or more second hybrid analog-digital repeater devices (e.g., the hybrid analog-digital repeater devices 106B and 106N) and convert back to the WLAN signal to serve one or more UEs 110 in a data throughput greater than a threshold throughput. The use of plurality of hybrid analog-digital repeater devices 106 extends the coverage area of the master WAP device 104A and one or more service WAP devices 108, allowing them to serve their corresponding UEs in areas that may have poor signal reception or are located farther away from the master WAP device 104A.

In accordance with an embodiment, the plurality of hybrid analog-digital repeater devices 106 may be disposed as a radio frequency (RF) bridge between the master WAP device 104A and the one or more service WAP devices 108 such that a data propagation path of user data relayed through a network of the plurality of hybrid analog-digital repeater devices 106 may be analog without any digital decoding or encoding of the user data in the first beam of RF signals to reduce latency less than a threshold time. For example, the data propagation path may comprise high-frequency analog circuitry to minimize latency to nanoseconds. Multi-hop relaying of intermediate frequency signals (e.g., mmWave signals) may happen without any digital encoding or decoding of the user data (i.e., payload). Further, a backchannel connectivity and control of the network of the plurality of hybrid analog-digital repeater devices 106 may be via a second WLAN frequency, based on a signal metadata of the first beam of RF signal. The second WLAN frequency may be less than the first WLAN frequency. While the data propagation path may remain entirely analog for lowest latency, the plurality of hybrid analog-digital repeater devices 106 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture.

In accordance with an embodiment, the plurality of hybrid analog-digital repeater devices 106 may serve as a RF communication bridge between the master WAP device 104A and one or more service WAP devices 108, which allows for the analog relay of user data through a network of the plurality of hybrid analog-digital repeater devices 106. The analog transmission of the user data reduces latency because there is no need for digital encoding and decoding processes, which can introduce delays. By transmitting user data (i.e., payload) in its original analog form, the wireless communication system 100A achieves faster transmission times, making it suitable for applications that require real-time communication, such as data streaming, video streaming, online gaming, and the like. Further, separating the data propagation path and control connectivity ensures that control signals do not interfere with the data transmission path. This separation is beneficial for maintaining the quality of service and preventing degradation of the data transmission path. Further, utilizing parallel channels for control and data connectivity allows for simultaneous communication of control signals and data packets. By operating these channels independently, the wireless communication system 100A prevents congestion and ensures that both control and data traffic receive sufficient bandwidth and priority. This parallel approach enhances network stability and reliability, particularly in environments with high data traffic. Furthermore, intermediate frequencies may be Millimeter-wave (mmWave) signals that operate at higher frequencies than traditional Wi-Fi signals, enabling faster data transfer rates and lower latency. By utilizing intermediate frequencies (e.g., mmWave frequencies or other intermediate frequencies in the range of 10-300 GHz) for analog data transmission between the master WAP device 104A and the one or more service WAP devices 108, the wireless communication system 100A achieves low-latency communication, say microseconds, making it ideal for applications that require rapid response times. Furthermore, lower frequency signals typically have better penetration and coverage, making them suitable for control and coordination purposes. By leveraging lower frequency WLAN signals (e.g., Wi-Fi® signals at 2.4 or 5 GHz) for backchannel communication, a reliable connectivity and coordination among the plurality of hybrid analog-digital repeater devices 106 may be provided. The second WLAN frequency may be in a range of 2.4-5 GHz. Alternatively stated, the intelligent combination of WLAN and mmWave signals enables hybrid coordination, leveraging the strengths of both technologies for optimized network performance. WLAN provides broader coverage and connectivity, while mmWave offers high-speed, low-latency communication. By synergistic integration of the plurality of hybrid analog-digital repeater devices 106 with the modified WAPs (the master WAP device 104A and the one or more service WAP devices 108), the wireless communication system 100A achieves responsive network-wide orchestration, enhancing overall network efficiency and responsiveness.

In accordance with an embodiment, the intermediate frequency band of the first beam of RF signals may be a mmWave frequency in a range of 24-300 GHz or other intermediate frequency in the range of 10-300 GHz. In accordance with an embodiment, the first WLAN frequency and the intermediate frequency band of the first beam of RF signals may be one of a licensed mmWave spectrum of a network operator or an unlicensed mmWave spectrum, or a combination thereof. In order to minimize interference, the wireless communication system 100A may be implemented as a wireless backhaul mesh network in the licensed mmWave band, where the communication channels may experience reduced interference as the network's resilience against potential disruptions is enhanced caused by interference from other networks. The exclusive use of dedicated frequencies allows for a more robust and interference-free communication infrastructure using a combination of WLAN frequencies and licensed mmWave frequencies contributing to improved network performance and quality of service.

In accordance with an embodiment, each of the master WAP device 104A and the one or more service WAP devices 108 may be configured to perform Multi-User, Multiple Input, Multiple Output (Mu-MIMO) to corresponding connected UEs via corresponding mmWave New Radio Unlicensed (NR-U) links. The use of millimeter-wave frequencies and Mu-MIMO together may provide high data rates and efficient use of the available spectrum. Millimeter-wave frequencies offer increased bandwidth, and Mu-MIMO enhances the overall network capacity by enabling simultaneous communication with multiple user devices. This may result in improved throughput and reduced latency, contributing to a more robust and high-performance wireless communication system, particularly in the context of 5G NR-U deployments.

Figure 1B:
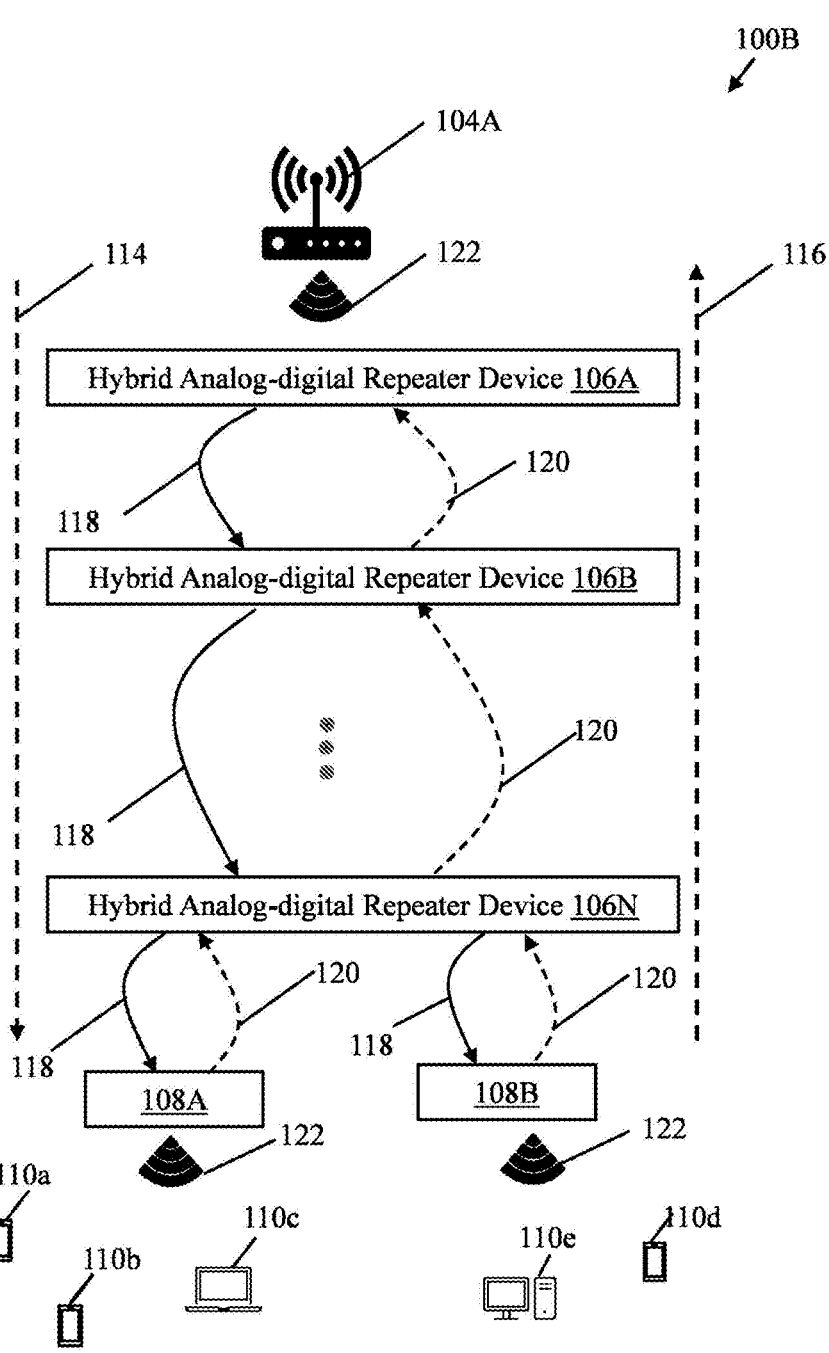
FIG. 1B is a diagram that illustrates an exemplary dual-path routing of user data across a plurality of hybrid analog-digital repeater devices in a wireless communication system, in accordance with an exemplary embodiment of the disclosure.

FIG. 1B is a diagram that illustrates an exemplary dual-path routing of user data across a plurality of hybrid analog-digital repeater devices in a wireless communication system, in accordance with an exemplary embodiment of the disclosure. FIG. 1B is explained in conjunction with elements from FIG. 1A. With reference to FIG. 1B, there is shown a network 100B of the plurality of hybrid analog-digital repeater devices 106, such as the hybrid analog-digital repeater devices 106A, 106B, and 106N.

In accordance with an embodiment, based on an instruction received form the central cloud server 102, each of the plurality of hybrid analog-digital repeater devices 106 may be configured to execute a differential polarized routing of receive and transmit radio frequency (RF) signals in the intermediate frequency (e.g., millimeter wave frequency) in which a downstream communication 114 and an upstream communication 116 may be performed in a different polarization state (e.g., a vertical polarization and a horizontal polarization) in the network 100B of the plurality of hybrid analog-digital repeater devices 106. The downstream communication 114 may refer one or more communication paths (e.g., one or more data propagation paths) from the one or more master WAP devices 104, such as the master WAP device 104A towards the one or more service WAP devices 108, such as the service WAP device 108A and the service WAP device 108B, via the network 100B of the plurality of hybrid analog-digital repeater devices 106, such as the hybrid analog-digital repeater devices 106A, 106B, and 106N. Further, in the downstream communication 114, the one or more service WAP devices 108 communicates corresponding user data to its corresponding UEs, such as the UEs 110a, 110b, and 110c (connected to the service WAP device 108A) and the UEs 110d and 110e (connected to the service WAP device 108B). In this embodiment, the network 100B of the plurality of hybrid analog-digital repeater devices 106 may be a daisy-chain network. The upstream communication 116 may refer to a communication path from the UEs and the one or more service WAP devices 108 towards the one or more master WAP devices 104, such as the master WAP device 104A via the network 100B of the plurality of hybrid analog-digital repeater devices 106.

In accordance with an embodiment, each of the plurality of hybrid analog-digital repeater devices 106 may be configured to transmit a first beam of RF signals 118 carrying user data in an intermediate frequency band (e.g., mmWave frequency) in a first polarization state towards its neighboring repeater node, which then amplifies and relays the first beam of RF signals 118 in the intermediate frequency (e.g., mmWave frequency) in the first polarization state in the downstream communication 114. Similarly, for the upstream communication 116, each of the plurality of hybrid analog-digital repeater devices 106 may be configured to transmit a second beam of RF signals 120 carrying user data in the intermediate frequency band in a second polarization state towards its neighboring repeater node, which then amplifies and relays further the second beam of RF signals 120 in the intermediate frequency band in the second polarization state in the upstream communication 116. The first polarization state may be different from the second polarization state. An example of the first and the second polarization state may be a vertical polarization state and a horizontal polarization state. In vertical polarization, the electric field component of the electromagnetic wave (i.e., the mmWave signal) oscillates vertically, meaning it moves up and down concerning the Earth's surface. In horizontal polarization, the electric field component of the electromagnetic wave (i.e., the mmWave signal) oscillates horizontally, moving side to side parallel to the Earth's surface.

In accordance with an embodiment, the central cloud server 102 may be further configured to cause the master WAP device 104A to communicate a wireless local area network (WLAN) signal 122 in a first WLAN frequency (e.g., higher frequency of the Wi-Fi® 6, 7 or 8) from the data source 112. The one or more service WAP devices 108 may be configured to receive the first beam of RF signals 118 in the intermediate frequency band (e.g., mmWave frequencies or other intermediate frequencies in the range of 10-300 GHz) from the one or more second hybrid analog-digital repeater devices (e.g., the hybrid analog-digital repeater devices 106N) and convert back to the WLAN signal 122 to serve one or more UEs 110 in a data throughput greater than a threshold throughput. The use of plurality of hybrid analog-digital repeater devices 106 extends the coverage area of the one or more service WAP devices 108, allowing them to serve its corresponding UEs in areas that may have poor signal reception or are located farther away from the master WAP device 104A, without adding to latency due to the one or more analog data propagation paths with dual-polarized signals.

In accordance with an embodiment, the central cloud server 102 may be configured to route data traffic to and from the one or more service WAP devices 108 using two different pairs of dual-polarized signals. Each pair of dual-polarized signals may take a different path through the wireless network, passing through a single chain of the plurality of hybrid analog-digital repeater devices 106 or different chains of hybrid analog-digital repeater devices among the plurality of hybrid analog-digital repeater devices 106. This provides rank-4 connectivity with completely different paths to the one or more service WAP devices 108 (e.g., the service WAP device 108A and the service WAP device 108B), thereby further enhancing resilience against blockages and interference. The rank-4 connectivity indicates multiple independent data streams that can be propagated via the hybrid repeater chains for improved wireless communication performance. For designated wireless links (e.g., certain critical links), the central cloud server 102 may be configured to coordinate between two synchronized service WAP devices, such as the service WAP devices 108A and 108B, to initiate separate streams over different RF chains. The independent streams may then be relayed through completely distinct hybrid repeater chains. This provides path redundancy to counter even simultaneous route disruptions.

In accordance with an embodiment, a donor side of each of the one or more service WAP devices 108 may be modified so that each of the one or more service WAP devices 108 may be configured to communicate with one or more hybrid analog-digital repeater devices over intermediate frequency (e.g., mmWave frequencies or other intermediate frequencies in the range of 10-300 GHz) using high-gain dual polarized antennas. In an implementation, a service side each of the one or more service WAP devices 108 may include a WLAN antenna and may not include a phase array antenna or any high-gain dual polarized antennas. Alternatively, in another implementation, the service side each of the one or more service WAP devices 108 may include a WLAN antenna and a phase array antenna. In such a case, the phase array antenna may be configured to communicate a beam of RF signals to its corresponding UEs or communicate the first WLAN signal at the same time depending on the position of its UE to be served. Alternatively, in another implementation, the service side each of the one or more service WAP devices 108 may include a phase array antenna without WLAN antenna. However, a WLAN adaptor (e.g., 2.4 GHz or 5 Ghz WLAN adaptor) may be provided in all implementations for low-frequency backchannel connectivity for the control channel.

Figure 1C:
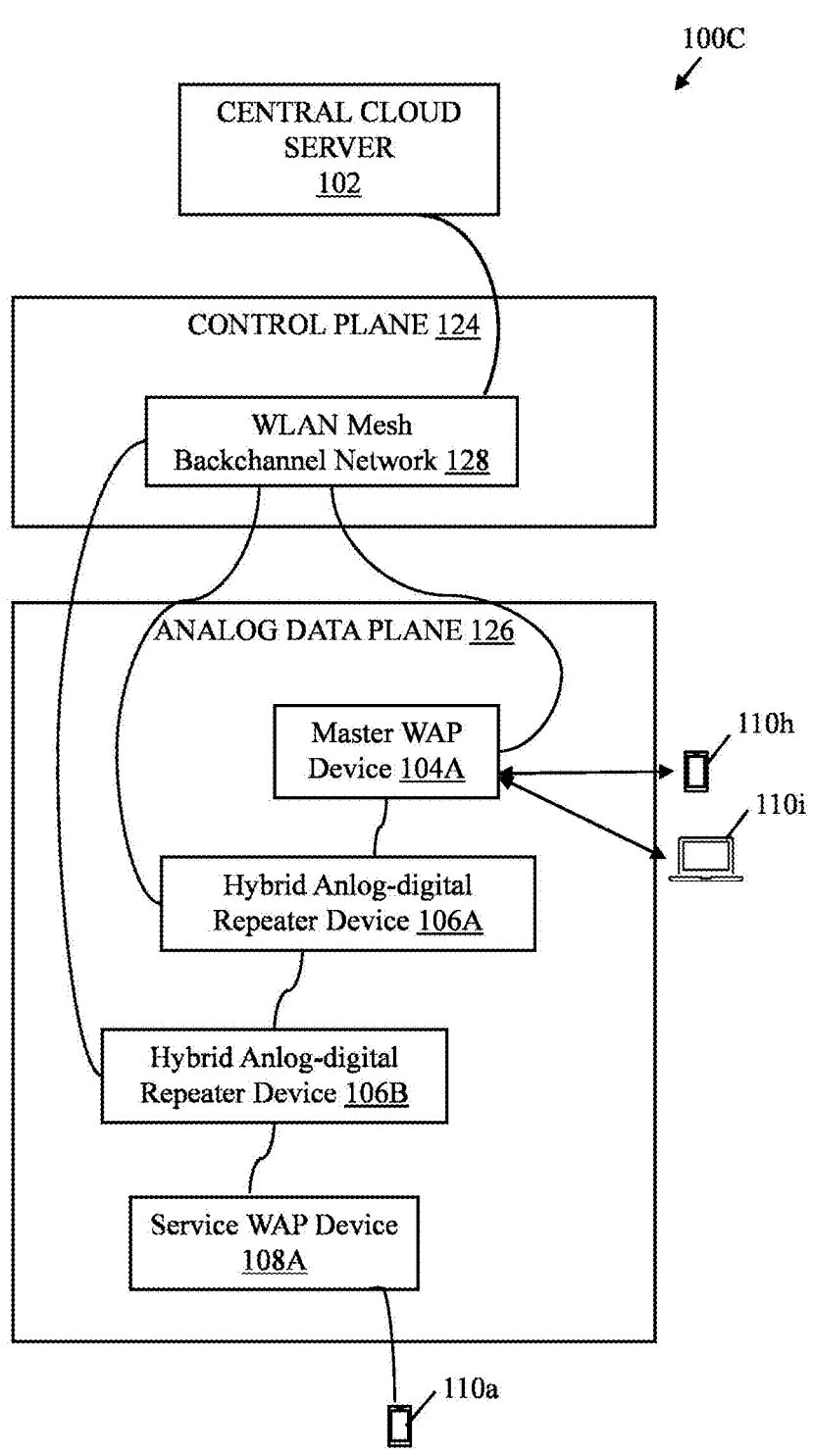
FIG. 1C is a diagram that illustrates an exemplary wireless communication system with a control plane and an analog data plane for telemetry information-based network role reassignments in a wireless backhaul mesh network, in accordance with an exemplary embodiment of the disclosure.

FIG. 1C is a diagram that illustrates an exemplary wireless communication system with a control plane and an analog data plane, in accordance with an exemplary embodiment of the disclosure. FIG. 1C is explained in conjunction with elements from FIGS. 1A and 1B. With reference to FIG. 1C, there is shown a wireless communication system 100C with a control plane 124 and an analog data plane 126.

In accordance with an embodiment, the wireless communication system 100C may employ a software-defined networking (SDN), where the control plane 124 may be separated from the analog data plane 126. In other words, the communication in management mesh for control and remote configuration of each network node is separate and independent from the data network, i.e., analog data plane 126. The data traffic (voice, video, etc.) flows in the data propagation path in analog form through the analog data plane 126, while the control plane 124 (signaling and management) uses a separate digital network, such as the WLAN mesh backchannel network 128 (e.g., may use 2.4 GHz or 5 GHz WLAN frequency). While data traverses the analog network, an out-of-band digital connectivity enables external coordination. The access points, such as the master WAP device 104A and the service WAP device 108A, may include a high bandwidth Wi-Fi® 7 or Wi-Fi® 8 compatible multi-user (MU) MIMO capability to provide wireless connectivity even in non-line-of sight paths. The one or more UEs, such as the UE 110h, the 110i, and the UE 110a may be Wi-Fi® 7 or Wi-Fi® 8 enabled and may connected to the wireless network using corresponding access points, such as the master WAP device 104A and the service WAP device 108A. Each of the master WAP device 104A and the service WAP device 108A may be equipped with multiple antennas to support Multi-User MIMO (MU-MIMO), which allows them to communicate with multiple devices concurrently.

In accordance with an embodiment, the plurality of hybrid analog-digital repeater devices 106, such as the hybrid analog-digital repeater devices 106A and 106B, may be configured to dynamically adjust their network topology based on instructions from the central cloud server 102. Further, based on the different types telemetry information (described in detail, for example, in FIG. 5), the central cloud server 102 may be configured to determine how each different types of network node, i.e., the master WAP device 104A, the plurality of hybrid analog-digital repeater devices 106, and the one or more service WAP devices 108 may connect to each other, forming a wireless backhaul mesh network. This provides an enhanced resilience, where even unforeseen failures in one part of the network may be bypassed by using alternative paths. The central cloud server 102 may be further configured to generate configuration updates tailored to each node based on its capabilities and context and push these updates to individual nodes using the digital backchannel. Each network node may receive its specific configuration update and applies it within its local area. This enables flexibility and adaptability, as network nodes can adjust their behavior based on local conditions. The local conditions may refer to various factors specific to individual network nodes or their surrounding environment. These factors may influence how the network node operates and how the centralized controller, such as the central cloud server 102 configures each network node. The local conditions may include variations in received signal strength, signal-to-noise ratio, and interference levels within each network node's area, a level of activity on different frequency bands available to each network node, a number and type of devices connected to the network node, movement of users and variation in data usage (e.g., streaming, downloads) within the node's coverage area, different applications bandwidth and latency requirements (e.g., gaming, video conferencing may have varying bandwidth and latency demands), or environmental factors, such as physical obstacles, weather, temperature and humidity. Each of the one or more service WAP devices 108, such as the service WAP device 108A, may utilize a separate repeater chain to avoid relying on a single path, just like couriers taking different roads based on the control instruction from the central cloud server 102. This eliminates a single point of failure. Further, multi-source coordinated connectivity provides redundancy against impairments. In other words, by having multiple master WAP devices and service WAP devices send the same user data (data streams), even if one is affected, the others can still deliver the user data to its UE.

In accordance with an embodiment, there may be a test node or a reference node (e.g., UE 110*f* may be a CPE as a test node), such as a customer premise equipment (CPE) in the wireless communication system 100A or 100C. The test node may be used as an independent reference node to ascertain network performance characteristics periodically or continuously, such as a current SNR, SINR, RSSI, TSSI, a throughput rate when served by one of the network node (one of the service access point devices or the master access point device) in the wireless communication system 100A or 100C. Such network performance characteristics may be reported to the central cloud server 102. The central cloud server 102 may use the information received independently by the test node for another layer of independent performance monitoring of the wireless backhaul network in the wireless communication system 100A or 100C along with the different types of telemetry information (e.g., the first type of telemetry information 508 and the second type of telemetry information 510 of FIG. 5, in an example) received from each network node. In case of detection of any performance drop, the central cloud server 102 may be further configured to detect where the fault is (i.e., identify one or more fault nodes) and accordingly re-configure one or more fault nodes to maintain or optimize the network performance (greater than defined threshold performance, for example, greater than 25 Giga byte per second throughput rate and the like).

Training phase of the neural network model 102B: The neural network model 102B may be trained using a first type of telemetry information from the repeater devices and a second type of telemetry information from the WAP devices/UEs. The first type of telemetry information and the second type of telemetry information have been described in detail, for example, in FIG. 5. In an example, the first type of telemetry information (vibrations, orientations, sensor readings etc.) and the second type of telemetry information (throughput, RSSI, locations etc.) may be preprocessed and formatted into suitable input vectors. Thereafter, relevant features may be extracted and encoded from the raw telemetry streams. The data may be normalized to facilitate training convergence. Using analytical models, simulations or historical data, optimal intra-node and inter-node beam parameters may be calculated for sample scenarios. These calculated optimal parameter values may then act as the labeled outputs or targets for the corresponding telemetry input vectors during training. The neural network model 102B may be a deep neural network model with multiple hidden layers employed to effectively model the highly non-linear mapping from the telemetry data to the beam parameters. The model architecture (number of layers, nodes, connections) may be iteratively tuned based on validation performance. The full preprocessed telemetry dataset (i.e., training datasets) may be split into training, validation and test sets while maintaining spatial and temporal coherence in these splits. The neural network model 102B may be then trained using the telemetry input-output pairs in batches using optimization techniques like gradient descent. Known techniques like dropout and regularization may be used to prevent overfitting. The validation set may be then used for tracking generalization performance and tuning hyperparameters. As the wireless backhaul starts operating, new streams of telemetry data may be continued to be collected and updated for training purposes. The neural network model 102B may be periodically retrained and fine-tuned in an online learning fashion on the new telemetry information to continue improving accuracy over time. In some implementations, multiple neural network models with different architectures may be trained in parallel using ensemble methods, where outputs may then be ensembled (e.g. averaged) to improve the overall prediction robustness. For example, in some cases, recurrent neural network (RNN) models may be trained on the historical telemetry data to capture temporal patterns. These RNNs may forecast short-term network traffic load based on detected daily/weekly cyclic patterns in throughput, RSSI etc. This enables proactively load balancing traffic across the backhaul mesh before congestion occurs. Further, in another example, convolutional neural networks (CNNs) may be trained to detect anomalies in infrared/thermal camera feeds of the repeater devices. These CNNs may be combined with RNNs to predict hardware degradations or impending failures based on temporal evolution of the detected anomalies. This allows proactively scheduling maintenance and avoiding failure events that disrupt the backhaul mesh. Furthermore, instead of training from scratch, the neural network model 102B may leverage transfer learning from pre-trained models on similar wireless domains. This accelerates convergence and allows effective training on relatively smaller operational telemetry datasets. The holistic training pipeline may thereby produce an ensemble of specialized neural network models that collectively analyze the multidimensional telemetry data to optimize intra-node and inter-node RF beam parameters for current operations, forecast future traffic patterns for load balancing, and predict and mitigate potential hardware faults.

Figure 2:
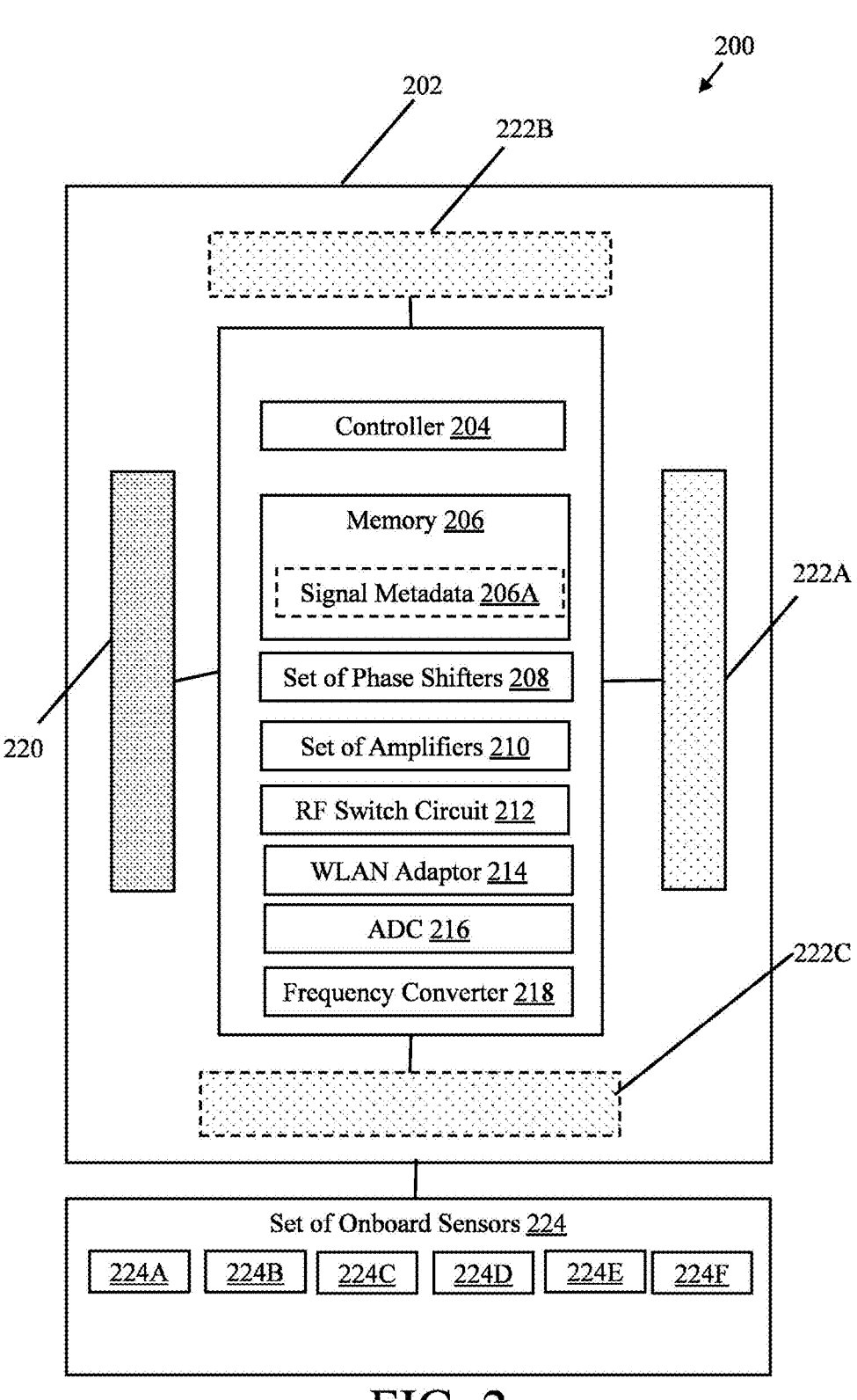
FIG. 2 is a block diagram that illustrates various components of an exemplary hybrid analog-digital repeater device configured in a switch node role in a wireless communication system, in accordance with an exemplary embodiment of the disclosure.

FIG. 2 is a block diagram that illustrates various components of an exemplary hybrid analog-digital repeater device of a wireless communication system, in accordance with an exemplary embodiment of the disclosure. FIG. 2 is explained in conjunction with elements from FIGS. 1A, 1B and 1C. With reference to FIG. 2, there is shown a block diagram 200 of a hybrid analog-digital repeater device 202. The hybrid analog-digital repeater device 202 may correspond to the plurality of hybrid analog-digital repeater devices 106.

The hybrid analog-digital repeater device 202 may include a controller 204, a memory 206, a set of phase shifters 208, a set of amplifiers 210, a radio frequency (RF) switch circuit 212, a wireless local area network (WLAN) adaptor 214, an analog-to-digital converter (ADC) 216, and a frequency converter 218. The hybrid analog-digital repeater device 202 may further include a donor antenna 220 and one or more service phased antenna arrays 222A, 222B, and 222C. Each of the plurality of hybrid analog-digital repeater devices 106 may further include a set of onboard sensors 224.

The controller 204 may be a Field Programmable Gate Array (FPGA), which may be configured to manage digital functions like the first type of telemetry information processing, parameter extraction and control channel interface to the central cloud server 102. The controller 204 may be configured to receive an incoming RF signal relay from an upstream node and relay the incoming RF signal to one or more neighboring nodes. The controller 204 may be configured to extract the signal metadata 206A by digital signal processing of a portion (e.g., a header portion) of the first beam of RF signals without decoding the user data of the first beam of RF signal.

The memory 206 may include suitable logic, circuitry, and/or interfaces that may be configured to store instructions executable by the controller 204. The memory 206 may temporarily store and update the telemetry information (i.e., the first type of telemetry information), which may be periodically communicated to the central cloud server 102. Examples of implementation of the memory 206 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. The memory 206 may store the signal metadata 206A.

The set of phase shifters 208 may be configured to perform precise phase control to digitally steer beams in directed orientations based on control instructions received from the central cloud server 102 or one of the network nodes under control of the central cloud server 102.

The set of amplifiers 210 may be configured to provide signal gain to overcome propagation losses and boost SNR to maintain link budgets over multiple hops of relaying, such as across the plurality of hybrid analog-digital repeater devices 106, all the way to the one or more UEs 110. The set of amplifiers 210 may be high-gain amplifiers designed to operate in the intermediate frequency bands (e.g., mmWave frequencies in 24-300 GHz or other intermediate frequencies in the range of 10-300 GHz).

The RF switch circuit 212 may be connected to the set of amplifiers 210. The RF switch circuit 212 may be configured to perform dynamic beam steering by switching between different service phased antenna arrays, such as the one or more service phased antenna arrays 222A, 222B, and 222C to route RF signals along different directions as required. This enables adaptable signal propagation, responding to changing network conditions and optimizing communication paths for improved reliability and performance. This dynamic beam steering capability is particularly beneficial in scenarios where the environment or network conditions may vary, allowing the wireless communication system 100A or 100C to adapt and maintain efficient signal transmission.

The WLAN adaptor 214 may be configured to handle lower WLAN frequencies (e.g., 2.4 GHz or 5 GHz in Wi-Fi® 7 or 8) to establish a backchannel communication link. This may be used for various purposes, including management and coordination between devices in a wireless network. The WLAN adaptor 214 may be configured to provide a backchannel connectivity and control of the network of the plurality of hybrid analog-digital repeater devices 106 via a second WLAN frequency, based on the signal metadata 206A of the first beam of RF signal.

The ADC 216 may be configured to convert a header portion of a RF signal (in intermediate frequency or WLAN frequency) from analog to digital domain. While the data path remains entirely analog for lowest latency, each of the plurality of hybrid analog-digital repeater devices 106, such as the hybrid analog-digital repeater device 202 may extract the signal metadata 206A from RF signals for analysis. This allows deriving wireless metrics like timing parameters, signal quality, interference levels, channel state information, and reference signals using DSP techniques.

The frequency converter 218 may be configured to upconvert or down convert one radio frequency to another radio frequency of an RF signal. For example, the hybrid analog-digital repeater device 202 may utilize the frequency converter 218 to convert a WLAN signal to a beam of RF signals in an intermediate frequency band (e.g., mmWave frequencies or other intermediate frequencies in the range of 10-300 GHz). The frequency converter 218 may perform frequency up conversion by frequency mixing of the WLAN signal with a local oscillator signal, generating an intermediate frequency (e.g., mmWave frequencies or other intermediate frequencies in the range of 10-300 GHz) for improved wireless communication performance. In some embodiments, the frequency converter 218 may include a phased locked loop (PLL) circuit, which acts as a local oscillator.

The donor antenna 220 may be communicatively coupled to a cascading receiver chain comprising various components (e.g., a set of low noise amplifiers (LNA), a set of receiver front end phase shifters, and a set of power combiners) for the signal reception (not shown for brevity). The donor antenna 220 may be configured to receive an incoming RF signal from an upstream node. The donor antenna 220 may be an WLAN antenna or a phase array antenna, such as a dual-polarized antenna.

The one or more service phased antenna arrays 222A, 222B, and 222C may be configured to relay a beam of RF signals to one or more neighboring downstream nodes. Each of the one or more service phased antenna arrays 222A, 222B, and 222C may be dual-polarized antennas, where separate antenna arrays may be used for horizontal and vertical polarizations allowing polarization diversity mechanisms. Each of the plurality of hybrid analog-digital repeater devices 106 (such as the hybrid analog-digital repeater device 202) may include multiple phased array antennas (e.g., the one or more service phased antenna arrays 222A, 222B, and 222C) with electrically steerable directive beams to focus signals along narrow beams. The phase antenna arrays may include individual phase shifters and amplifiers behind each radiating element to shape and control the beam pattern digitally.

The set of onboard sensors 224 may include one or more image sensors 224A, a lidar sensor 224B, a Radar 224C, a spatial position sensor 224D, an inertial measurement unit (IMU) sensor 224E, and a temperature sensor 224F. A wide range of sensors may be integrated or connected to each analog hybrid analog-digital repeater device of the plurality of hybrid analog-digital repeater devices 106 to enrich each analog hybrid analog-digital repeater device with environmental awareness for intelligent intra-node and inter-node optimizations. The one or more image sensors 224A may be used to visually monitor the surroundings of each network node (i.e., each analog hybrid analog-digital repeater device). Examples of the one or more image sensors 224A may include but are not limited to color image sensors (e.g., high-resolution RGB sensor) and infrared image sensors (e.g., IR cameras). The lidar sensor 224B may be referred to as light detection and ranging sensors used to enable accurate three-dimensional (3D) profiling and depth perception of surroundings of each network node (i.e., each analog hybrid analog-digital repeater device) for precise beam alignment. The Radar 224C may be a built-in radar to detect and track motion to monitor movement patterns of surrounding objects and predict potential RF signal blockers. The spatial position sensor 224D may be a global navigation satellite system (GNSS) sensor, such as global positioning system (GPS) to provide location awareness for each network node used for geospatial analytics and positioning capabilities. The IMU sensor 224E may include a combination of accelerometers, gyroscopes, and magnetometers (sometimes magnetometers may not be used) that typically measures body's specific force, angular rate, and orientation of a given body. In this case, such raw IMU output may be processed to measure node vibrations, shocks, and orientation changes at each network node (i.e., each analog hybrid analog-digital repeater device).

Figure 3:
FIG. 3 is a block diagram that illustrates various components of an exemplary master wireless access point (WAP) device configured in a primary gateway role in a wireless communication system, in accordance with an exemplary embodiment of the disclosure.
Figure 3:
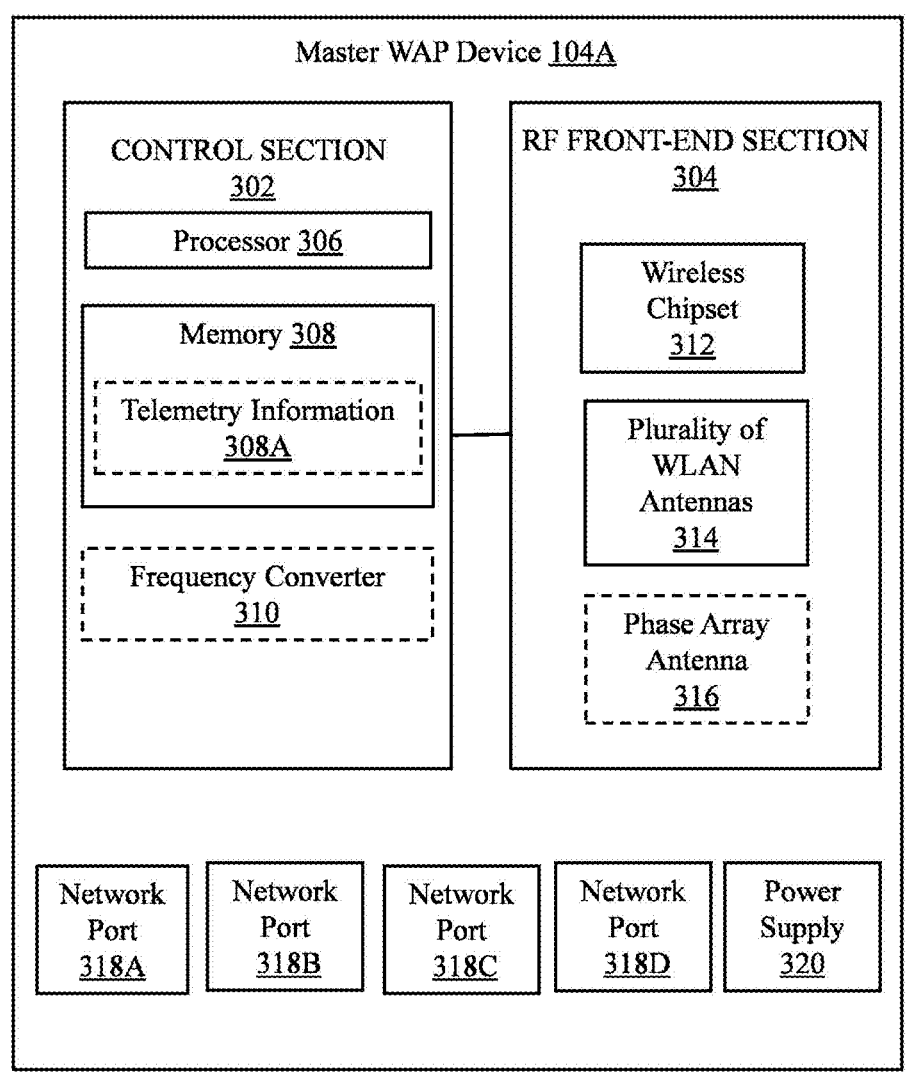

FIG. 3 is a block diagram that illustrates various components of an exemplary master wireless access point (WAP) device of a wireless communication system, in accordance with an exemplary embodiment of the disclosure. FIG. 3 is explained in conjunction with elements from FIGS. 1A, 1B, 1C, 2A, and 2B. With reference to FIG. 3, there is shown a block diagram 300 of the master WAP device 104A. The master WAP device 104A may correspond to the one or more master WAP devices 104 (FIG. 1A). The master WAP device 104A may include a control section 302 and a front-end RF section 304. The control section 302 may include a processor 306 and a memory 308, which may include the telemetry information 308A (i.e., the second type of telemetry information). In an implementation, the control section 302 may include a frequency converter 310. In some implementations, the frequency converter 310 may not be provided. The front-end RF section 304 may include a wireless chipset 312 and a plurality of WLAN antennas 314. In some implementations, the master WAP device 104A may be modified to further include a high-gain dual polarized antenna, such the phase array antenna 316. The master WAP device 104A may include a plurality of network ports, such as network ports 318A to 318D, and a power supply 320. The processor 306 may be communicatively coupled to the memory 308, the frequency converter 310 (when provided), and the different components of the front-end RF section 304 and the master WAP device 104A.

The processor 306 may be configured to communicate a wireless local area network (WLAN) signal in a first WLAN frequency from the data source 112. The processor 306 may be responsible for overall processing tasks, routing data and managing network operations and receiving instructions from the central cloud server 102. The processor 306 may be a multi-core processor to handle the increased demands of Wi-Fi® 7 or 8, beamforming, and Mu-MIMO.

The memory 308 may include the telemetry information 308A. The telemetry information 308A may be the second type of telemetry information associated with the UEs connected directly to the master WAP device 104A or via the one or more service WAP devices 108. Additionally, telemetry information 308A (i.e., the second type of telemetry information) may comprise a unique identifier (ID) of the master WAP device 104A, its geo-location, an operational state of the master WAP device 104A, and the signal metadata of WLAN signals or mmWave signals communicated by the master WAP device 104A. The memory 308 may further store temporary data and processing buffers to maintain smooth network performance. Examples of the implementation of the memory 308 may be similar to that of the memory 206 of FIG. 2.

The frequency converter 310 may be present when a functionality of the root node (one of the hybrid analog-digital repeater device) is implemented in the master WAP device 104A. When present, the frequency converter 310 may be used to up convert or down convert frequencies.

The wireless chipset 312 may be a hardware component responsible for transmitting and receiving WLAN (Wi-Fi®) signals, supporting multiple frequency bands (e.g., 2.4 GHz, 5 GHz, and 6 GHz bands or 6-9 GHz bands), and processing radio signals, such as modulation, demodulation, filtering, and amplification to ensure seamless communication with the one or more Wi-Fi® enabled UEs 110. The wireless chipset 312 may include radio elements that may convert digital data into radio waves for transmission and vice versa.

The plurality of WLAN antennas 314 may be configured to transmit and receive WLAN (Wi-Fi®) signals. The plurality of WLAN antennas 314 may be in MIMO configuration for performing MU-MIMO and beamforming to enhance coverage and signal strength, for the one or more UEs 110. The number of antennas in the MIMO configuration may vary depending on use case (e.g., consumer grade or enterprise grade), for example 2×2, 4×4 or 8×8 MIMO configurations may be provided.

In some implementations, alternatively, the master WAP device 104A may be modified to include one or more high-gain antennas, such as the phase array antenna 316 to capture a 5G or 6G mmWave cellular signal from a radio access network (RAN) node (e.g., a gNB or a 5G or 6G small cell) and/or to relay a mmWave signal to one or more hybrid analog-digital repeater devices of the plurality of hybrid analog-digital repeater devices 106.

The network port 318A may be an optical fiber port. The network port 318B may be an Ethernet port. The network port 318C may be a WLAN Fast Ethernet (FE) port. The network port 318D may be a USB port. The power supply 320 may be configured to provide power to the various components of the master WAP device 104A.

Figure 4:
FIG. 4 is a block diagram that illustrates various components of an exemplary service WAP device configured in a service wireless access point role in a wireless communication system, in accordance with an exemplary embodiment of the disclosure.
Figure 4:
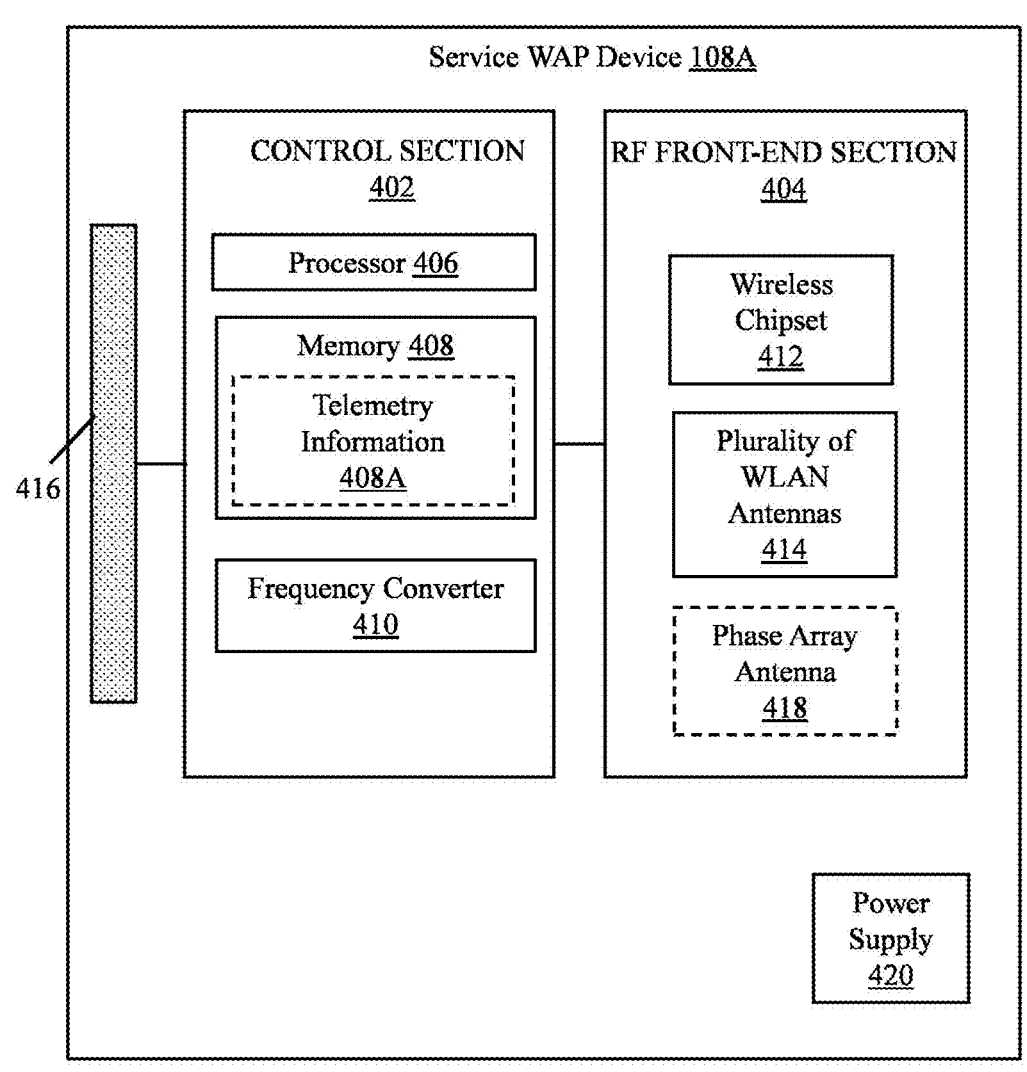

FIG. 4 is a block diagram that illustrates various components of an exemplary service WAP device of a wireless communication system, in accordance with an exemplary embodiment of the disclosure. FIG. 4 is explained in conjunction with elements from FIGS. 1A, 1B, 1C, 2A, 2B, and 3. With reference to FIG. 4, there is shown a block diagram 400 of the service WAP device 108A. The service WAP device 108A may correspond to the one or more service WAP devices 108 (FIG. 1A). The service WAP device 108A may include a control section 402 and a front-end RF section 404. The control section 402 may include a processor 406 and a memory 408 (with telemetry information 408A), and a frequency converter 410. The front-end RF section 404 may include a wireless chipset 412, a plurality of WLAN antennas 414. In some implementations, the service WAP device 108A may be modified to further include a high-gain dual polarized antenna, such the phase array antenna 416 at a donor side connected to a donor port. In an implementation, the service side may have the plurality of WLAN antennas 414. In another implementation, the service side may include another high-gain antenna, such as a phase array antenna 418 along with the plurality of WLAN antennas 414. In some implementations, the network ports for wired communication may not be provided as it primarily interfaces with wireless WLAN devices. However, in some cases, the network ports like the master WAP device 104A may be provided. The processor 406 may be communicatively coupled to the memory 408, the frequency converter 410 and the different components of the front-end RF section 404. The service WAP device 108A may further include a power supply 420 to provide power to the various components of the service WAP device 108A.

The processor 406 may be configured to receive a first beam of RF signals in the intermediate frequency band (e.g., mmWave frequencies or other intermediate frequencies in the range of 10-300 GHz) from the one or more second hybrid analog-digital repeater devices (e.g., one or more of the hybrid analog-digital repeater devices 106B to 106N)

and convert back to the WLAN signal to serve one or more UEs 110 in a data throughput greater than a threshold throughput (e.g., 30-100 Gbps).

The memory 408 may include the telemetry information 408A, which may be the second type of telemetry information 408A associated with its connected UEs. Additionally, the telemetry information 408A (i.e., the second type of telemetry information) may comprise a unique identifier (ID) of the service WAP device 108A, its geo-location, an operational state of the service WAP device 108A, and the signal metadata of WLAN signals or mmWave signals received/transmitted by the service WAP device 108A. Examples of the implementation of the memory 408 may be similar to that of the memory 206 of FIG. 2.

The frequency converter 410 may be used to convert the first beam of RF signals in the intermediate frequency band to the first WLAN frequency (e.g., within 6-9 GHz). In some cases, the intermediate frequency may be converted to another intermediate frequency for wide beam relay. Examples of implementation of the wireless chipset 412, the plurality of WLAN antennas 414, the phase array antennas 416 and 418 may be similar to that of the master WAP device 104A of FIG. 3.

Figure 5:
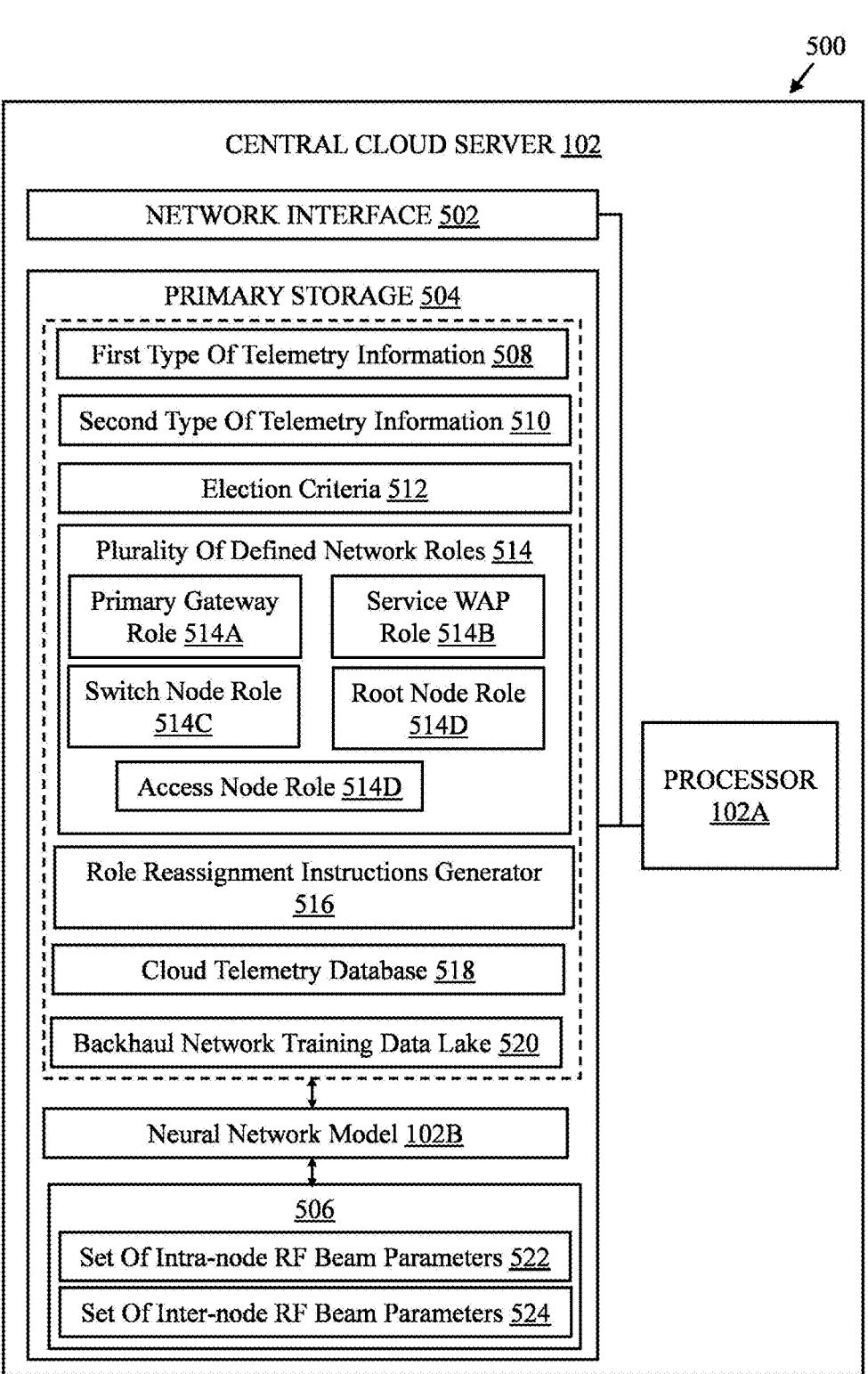
FIG. 5 is a block diagram that illustrates various components of an exemplary central cloud server for telemetry information-based network role reassignments in a wireless backhaul mesh network in a wireless communication system, in accordance with an exemplary embodiment of the disclosure.

FIG. 5 is a block diagram that illustrates various components of an exemplary central cloud server of a wireless communication system, in accordance with an exemplary embodiment of the disclosure. FIG. 5 is explained in conjunction with elements from FIGS. 1A, 1B, 1C, 2A, 2B, 3, and 4. With reference to FIG. 5, there is shown a block diagram 500 of the central cloud server 102. The central cloud server 102 may include the processor 102A, the neural network model 102B, a network interface 502 and a primary storage 504. The primary storage 504 may include an environment-aware enhanced backhaul network database 506, a first type of telemetry information 508, a second type of telemetry information 510, election criteria 512, a plurality of defined network roles 514, a role reassignment instructions generator 516, a cloud telemetry database 518, and a backhaul network training data lake 520. The environment-aware enhanced backhaul network database 506 may include a set of intra-node radio frequency (RF) beam parameters 522 and a set of inter-node RF beam parameters 524. The plurality of defined network roles 514 may include a primary gateway role 514A, a service wireless access point role 514B, a switch node role 514C, a root node role 514D, or an access node role 514E.

In operation, there may be an initial network set up phase. The central cloud server 102 may be configured to establish a dedicated control channel via the control plane 124 for secure communication between the central cloud server 102 and each of the plurality of hybrid analog-digital repeater devices 106. For example, the central cloud server 102 may be configured to establish a digital backchannel (e.g., the WLAN mesh backchannel network 128) via a wireless local area network (WLAN) frequency (e.g., may use existing 2.4 GHz or 5 GHz WLAN frequency). Each of the plurality of hybrid analog-digital repeater devices 106 may be assigned a unique identifier (ID) during manufacturing. This allows the central cloud server 102 to identify and communicate with each hybrid analog-digital repeater device individually over the WLAN mesh backchannel network 128 for control and configuration purposes. This initial WLAN mesh backchannel network 128 may be established on lower frequencies (e.g., existing Wi-Fi® frequencies like 2.4/5 GHz may be leveraged) allows the central cloud server 102 to initiate data ingestion of received data from each network node. Each of the plurality of hybrid analog-digital repeater device

106 may be initialized to be receptive to the central cloud server's instructions. This may involve activating each network node to be connected to a WLAN network. The central cloud server 102 may be configured to broadcast a network name, such as a service set identifier (SSID), of the WLAN mesh backchannel network 128, allowing each network node including the plurality of hybrid analog-digital repeater device 106 strategically deployed within range to detect and connect to the WLAN mesh backchannel network 128. Each of the plurality of hybrid analog-digital repeater devices 106 may scan and identify the WLAN mesh backchannel network 128 using its SSID and establish a connection to it. Once connected, authentication operations and/or mechanisms (e.g., WPA2-PSK) may be employed to verify the identity of the network nodes and ensure secure communication. In an example, encryption protocols (e.g., AES) may then be applied to protect control instructions and configurations transmitted over the backchannel, i.e., the WLAN mesh backchannel network 128. Furthermore, encryption keys may be securely embedded into each of the plurality of hybrid analog-digital repeater devices 106 during deployment. The encryption keys rotation may be done automatically over-the-air periodically by the central cloud server 102.

The central cloud server 102 may be further configured to obtain the first type of telemetry information 508 from the plurality of hybrid analog-digital repeater devices 106. Each of the plurality of hybrid analog-digital repeater devices 106 may include the set of onboard sensors 224, which may capture sensor data to enrich each analog hybrid analog-digital repeater device with environmental awareness for intelligent intra-node and inter-node optimizations. The central cloud server 102 may be configured to obtain real-time or near real time telemetry information (i.e., the first type of telemetry information 508) from the plurality of hybrid analog-digital repeater devices 106 including traffic loads, latency, signal quality metrics, interference levels, and the captured sensor data.

In accordance with an embodiment, the first type of telemetry information 508 obtained from the plurality of hybrid analog-digital repeater devices 106 may comprise a unique identifier (ID) of each of the plurality of hybrid analog-digital repeater devices 106, a geo-location of each of the plurality of hybrid analog-digital repeater devices 106, an operational state of the plurality of hybrid analog-digital repeater devices 106, and signal metadata 206A of an incoming beam of RF signals at each of the plurality of hybrid analog-digital repeater devices 106. Each of the plurality of hybrid analog-digital repeater devices 106 may be assigned a unique identifier, allowing for individual identification, and tracking within via the WLAN mesh backchannel network 128. This helps in management, troubleshooting, and monitoring purposes. During the initial network set up phase, the central cloud server 102 may be further configured to acquire the geo-location of each of the plurality of hybrid analog-digital repeater devices 106 using the spatial position sensor 224D provided in the set of onboard sensors 224 of each hybrid analog-digital repeater device. The geo-location of each of the plurality of hybrid analog-digital repeater devices 106 may be in latitudes and longitudes pairs, which may be normalized by the central cloud server 102 to range between 0 and 1. Such preprocessing may also be done for other raw telemetry information (i.e., the first type of telemetry information 508) obtained from the plurality of hybrid analog-digital repeater devices 106 and the preprocessed data may be stored in the cloud telemetry database 518. The operational state of the plurality of hybrid analog-digital repeater devices 106 may indicate whether a given hybrid analog-digital repeater device is active and communicating one or more data streams with an upstream node or one or more downstream neighboring nodes, or not active and not communicating data streams to any of the one or more downstream neighboring nodes or the upstream node. The operational state may provide insights into whether each of the plurality of hybrid analog-digital repeater devices 106 are functioning properly, are offline, or experiencing issues. The monitoring of the operational state may be useful in proactive maintenance and fault detection.

In accordance with an embodiment, the first type of telemetry information 508 may include the signal metadata 206A of the incoming beam of RF signals at each of the plurality of hybrid analog-digital repeater device 106. The signal metadata 206A may comprise timing information associated with a radio frame of the incoming beam of RF signals, system information, channel state information, a cell identity (ID), a beam ID, a signal strength, a signal to noise ratio (SNR), an interference level, or other signal quality metrics. The timing information associated with the radio frame of the incoming beam of RF signals may indicate timing characteristics of the incoming RF signals used for synchronization and coordination within the network. The timing information may include frame timing, which is indicative of a start and duration of the radio frame within which data is transmitted. This timing synchronization ensures that the transmitter and receiver are aligned, enabling accurate decoding of the transmitted information. The system information may include details about the wireless network parameters, such as cell identity (ID), a frequency band allocated to tune into the correct frequency for communication, system bandwidth that specifies the total bandwidth available for communication used to determine the maximum data rates supported by the network, a Modulation and Coding Scheme (MCS) that defines the modulation scheme and coding rate used for data transmission, transmission power levels indicative of available transmission power levels allowed in the network used to optimize coverage and interference. The channel state information may indicate the current state of the wireless communication channel between a transmitter and a receiver, and may include, for example, a channel response (indicates about signal attenuation, phase shifts, and multipath propagation), a channel frequency response (indicates how the channel responds to signals at different frequencies), Signal-to-Noise Ratio (SNR), channel capacity, spatial correlation (indicates the spatial characteristics of the channel, such as information about signal arrival angles and signal strengths from different directions), and channel coherence time (indicates the time duration over which the channel remains relatively constant).

In accordance with an embodiment, the central cloud server 102 may be further configured to obtain beam labels from each of the plurality of hybrid analog-digital repeater devices 106 as a part of the first type of telemetry information 508. The beam labels may be obtained by activating an exhaustive beam search procedure and detecting the highest power beam available at each node. An initial dataset that may comprise location-beam pairs may be generated for different times of day. The location-beam pairs may be for multiple routes that pass through different neighboring nodes surrounding each of the plurality of hybrid analog-digital repeater devices 106. The initial dataset of the location-beam pairs may capture information about the possible routes and beams that can be used at different times of day when routing data signals through the network of plurality of hybrid analog-digital repeater devices 106 and their neighboring nodes. The data of location-beam pairs for different times may account for variations in conditions or interference that may impact which routes and/or beams are optimal in terms of signal strength and data throughput at different points in time.

In accordance with an embodiment, the first type of telemetry information 508 obtained from the plurality of hybrid analog-digital repeater devices 106 may further comprise surrounding-environment sensed information, which may be sensed by the set of onboard sensors 224 at each of the plurality of hybrid analog-digital repeater devices 106. The surrounding-environment sensed information may comprise visual information surrounding of each of the plurality of hybrid analog-digital repeater devices 106, light detection and ranging (Lidar) sensor information, and motion tracking data of one or more moving objects surrounding each of the plurality of hybrid analog-digital repeater devices 106. The integration of sensor data, including visual information, Lidar sensor information, and motion tracking data, into telemetry information obtained from the plurality of hybrid analog-digital repeater devices 106 may be used to create a rich and detailed understanding of the environment surrounding each hybrid analog-digital repeater device. By combining data from multiple sensors, the central cloud server 102 may be configured to construct a unified 3D environmental model (may also be referred to as a unified 3D environmental representation) indicative of a holistic 3D representation of the surroundings, allowing it to capture visual details, accurately profile the environment in three dimensions, and track the movement of objects in real-time. In other words, a comprehensive digital twin representation of the network's surroundings may be generated using positional, motion, and thermal information. This integration enhances situational awareness within the network to respond effectively to dynamic environmental changes. The unified 3D environmental model may enable real-time or near real-time simulation, monitoring, and optimization of network performance, allowing for proactive maintenance, efficient resource allocation, and adaptive configuration. Furthermore, specific sensor capabilities such as radar-based motion detection and Lidar-based 3D profiling enable the central cloud server 102 to identify movement patterns, predict potential obstructions or blockers, and precisely align signal beams for optimal network coverage and efficiency.

In accordance with an embodiment, the first type of telemetry information 508 may further comprise vibration information indicative of a change in vibration detected at each of the plurality of hybrid analog-digital repeater devices 106. The central cloud server 102 may be configured to monitor vibration information over a period at each of the plurality of hybrid analog-digital repeater devices 106. The IMU sensor 224E may be configured to output raw IMU data, which may be processed to measure node vibrations, shocks, and orientation changes at analog hybrid analog-digital repeater device.

In accordance with an embodiment, the first type of telemetry information 508 further may further comprise antenna array orientation change information indicative of a change in an orientation of a donor antenna 220 and one or more service phased antenna arrays 222A, 222B, and 222C of each of the plurality of hybrid analog-digital repeater devices 106. The change in the orientation of the donor antenna 220 and the one or more service phased antenna arrays 222A, 222B, and 222C may impact the quality of signal reception and transmission, so monitoring the antenna array orientation change information may be useful to determine if orientation changes may be contributing to issues like coverage holes or interference.

The central cloud server 102 may be further configured to obtain a second type of telemetry information 510 from the master WAP device 104A and the one or more service WAP devices 108. The second type of telemetry information 510 may be different from the first type of telemetry information 508. The first type of telemetry information 508 may be related to the state of the repeater devices themselves (i.e. performance of the plurality of hybrid analog-digital repeater devices 106), whereas the second type of telemetry information 510 may be related to the performance metrics and characteristics of the end user devices connected to the WAP devices (the master WAP device 104A and the one or more service WAP devices 108) in the network, providing insights into the user experience.

In accordance with an embodiment, the second type of telemetry information 510 obtained from the master WAP device 104A and the one or more service WAP devices 108 may comprise user equipment (UE) related information of one or more UEs wirelessly connected to a corresponding wireless access point pertaining to the master WAP device 104A and the one or more service WAP devices 108. In an implementation, the UE related information in the second type of telemetry information 510 may comprise a Received Signal Strength Indicator (RSSI), a throughput, a latency, a packet loss measurement, a channel utilization, an interference level, a retransmission or error rate, device information, and location data associated with each UE of the one or more UEs connected to the corresponding wireless access point.

The central cloud server 102 may be further configured to determine the set of intra-node RF beam parameters 522 and the set of inter-node RF beam parameters 524 for each of the plurality of hybrid analog-digital repeater devices 106 based on the first type of telemetry information 508 and the second type of telemetry information 510. The plurality of hybrid analog-digital repeater devices 106 may be disposed as a RF bridge between the master WAP device 104A and the one or more service WAP devices 108. The central cloud server 102 may be further configured to utilize the different types of telemetry information from the different types of network nodes, such as the plurality of hybrid analog-digital repeater devices 106 and WAP devices (the master WAP device 104A and the one or more service WAP devices 108) in the network to determine the set of intra-node RF beam parameters 522 and the set of inter-node RF beam parameters 524. The set of intra-node RF beam parameters 522 may be node-specific parameters that control the configuration and operation of the RF beams within a single hybrid analog-digital repeater device of the plurality of hybrid analog-digital repeater devices 106. The set of intra-node RF beam parameters 522 may optimize how each hybrid analog-digital repeater device may receive the donor signal and form the service beams to provide coverage within its surrounding area. The set of inter-node RF beam parameters 524 may be the set of parameters that controls the RF beam characteristics for the wireless links between two or more neighboring hybrid analog-digital repeater devices that form the wireless backhaul mesh network.

In accordance with an embodiment, the set of intra-node RF beam parameters 522 comprises two or more of: a phase shifting configuration for a donor antenna 220 and one or more service phased antenna arrays 222A, 222B, and 222C of each of the plurality of hybrid analog-digital repeater devices 106, azimuth and elevation angles of one or more service beams of RF signals from the one or more service phased antenna arrays 222A, 222B, and 222C, a beam width of the one or more service beams of RF signals, a modulation scheme of the one or more service beams of RF signals, a beam gain of the one or more service beams of RF signals, a polarization type of a donor beam of RF signal and the one or more service beams of RF signals, and an intermediate frequency selection parameter for the donor beam of RF signal and the one or more service beams of RF signals at each of the plurality of hybrid analog-digital repeater devices 106.

In an implementation, for the donor antenna 220, if the vibration information in the first type of telemetry information 508 indicates a vibration rate (e.g., high vibrations) greater than a threshold rate, the central cloud server 102 may be further configured to predict a misalignment of the donor antenna 220 in an upcoming time period. The central cloud server 102 may be further configured to determine and communicate an adjusted phase shifting configuration of the donor antenna 220 to compensate for the misalignment.

In an implementation, for the one or more service phased antenna arrays 222A, 222B, and 222C, if the battery power level indicates that one or more hybrid analog-digital repeater devices of the plurality of hybrid analog-digital repeater devices 106, may be running low on power, the beam gain and transmit power for service beams from the one or more service phased antenna arrays 222A, 222B, and 222C may be temporarily reduced to conserve energy. Further, if the first type of telemetry information 508 indicates hardware issues on specific antenna arrays of the one or more service phased antenna arrays 222A, 222B, and 222C, the central cloud server 102 may be configured to cause deactivation of those specific antenna arrays while re-optimizing and re-configuring remaining antenna arrays using new angles, beam patterns etc.

In an implementation, the azimuth and elevation angles of one or more service beams of RF signals from the one or more service phased antenna arrays 222A, 222B, and 222C may be determined by synergistically combining the first type of telemetry information 508 and the second type of telemetry information 510. For example, from the first type of telemetry information 508, the antenna array orientation change information may provide the baseline orientation of the one or more service phased antenna arrays 222A, 222B, and 222C, on each of the plurality of hybrid analog-digital repeater devices 106. Further, the vibration information may indicate potential temporary misalignments that need to be compensated for in the beam angles. From the second type of telemetry information 510, the location data associated with each UE of the one or more UEs connected to the corresponding wireless access point may provide a map of user distribution in the coverage area. Further, low RSSI from UEs in certain zones may indicate that those areas need better angular coverage from the service beams. Furthermore, poor performance from UEs in certain locations may further highlight zones requiring more focused beam coverage. The central cloud server 102 may be further configured to acquire the known orientation of each service antenna array of the one or more service phased antenna arrays 222A, 222B, and 222C and overlay the UE location data the second type of telemetry information 510 to identify high density user zones that need prioritized coverage. Thereafter, the central cloud server 102 may be further configured to determine the azimuth or elevation adjustments needed to steer beams from each service antenna array of the one or more service phased antenna arrays 222A, 222B, and 222C towards these priority zones. The central cloud server 102 may be further configured to check for UEs with poor RSSI or throughput outside the high-density areas, which may need additional beams steered their way. Thereafter, the central cloud server 102 may be further configured to determine any temporary misalign- ments based on the vibration information from the first type of telemetry information 508 to compensate the calculated beam angles. Thereafter, the final optimized azimuth and elevation angles balancing coverage of high-density areas while not leaving poor zones unserved may then be com- municated as the set of intra-node RF beam parameters 522. Thus, the antenna orientation data may be combined with the UE locational performance data, adjusting the beam angles dynamically to concentrate RF energy towards the areas requiring maximum service at that point. The vibration data allows compensating for any temporary misalignments.

In an implementation, the central cloud server 102 may be further is configured to dynamically determine the optimal modulation scheme for the service beams transmitted by each hybrid analog-digital repeater device by analyzing the first type of telemetry information 508 and the second type of telemetry information 510. UEs with higher SINR values may be identified as candidates for higher order modulation schemes like 256-QAM to maximize throughput. However, if a UE is experiencing high errors despite having an apparently good SINR, the central cloud server 102 may instead configure a more robust, lower order modulation scheme like QPSK or 16-QAM for that UE's service beam. This accounts for potential signal quality degradations caused by factors like vibrations, shocks or antenna mis- alignments. The central cloud server 102 may be configured to maximize the throughput for each UE by configuring the highest modulation scheme that the SINR can reliably sustain, while using more robust modulations in lower SINR regions or for UEs experiencing performance issues. Alter- natively stated, different modulation schemes may be con- figured concurrently across the multiple service beams based on the prevalent conditions for each UE.

In accordance with an embodiment, by analyzing the first type of telemetry information 508 and the second type of telemetry information 510, the central cloud server 102 may be further configured to set the beam gain separately for each service beam to prioritize gain towards high UE density areas (UE density area greater than a defined density) while reducing interference elsewhere (i.e., low UE density areas). The central cloud server 102 may be further configured to adjust the polarization type for the donor beam reception to minimize cross-polarized interference detected by each hybrid analog-digital repeater device itself. The central cloud server 102 may be further configured to configure alternating polarizations (slant-horizontal/slant-vertical) across the service beams to reduce self-interference. The central cloud server 102 may be further configured to temporarily increase beam gain if UE RSSI is below a threshold RSSI (i.e., very low) due to a detected repeater orientation issue.

In an implementation, the central cloud server 102 may be further is configured to determine the intermediate fre- quency selection parameter, which may determine the spe- cific frequency channel used for the donor beam received and the service beams transmitted by each hybrid analog- digital repeater device of the plurality of hybrid analog- digital repeater devices 106. The central cloud server 102 may be further configured to monitor the channel utilization and interference level reported by UEs on the current frequency channel. If utilization or interference crosses a threshold, indicating congestion/noise, such channel may be avoided. The central cloud server 102 may be further configured to check for high repeater device vibrations that could indicate temporary external interferers in the environ- ment and further may analyze throughput and latency to see if the current frequency is unable to meet performance requirements. If any of these indicators from the first type of telemetry information 508 and the second type of telemetry information 510 indicate issues with the current frequency channel, the central cloud server 102 may identify an alternate intermediate frequency channel available in that area based on its channel mapping data and may set the alternate intermediate frequency as a parameter for that repeater's donor beam reception and service beam transmis- sion. If temperature and hardware issues are detected in one or more of the plurality of hybrid analog-digital repeater devices 106, the central cloud server 102 may further block such hybrid analog-digital repeater devices from using fre- quencies in certain ranges. Thus, by monitoring the fre- quency channel quality and performance based on a fusion of dedicated repeater telemetry (i.e., the first type of telem- etry information 508) and crowdsourced UE and WAP telemetry (i.e., the second type of telemetry information 510), the central cloud server 102 may dynamically switch the intermediate frequency parameter per repeater to hop to cleaner channels as required. This ensures reliable coverage while avoiding interference and congestion.

In accordance with an embodiment, the set of inter-node RF beam parameters 524 may comprise an activate-deacti- vate state control parameter indicative of which service phased antenna array of the one or more service phased antenna arrays of each of the plurality of hybrid analog- digital repeater devices 106 to activate or deactivate at a given timepoint for firing of a corresponding beam of RF signal at the given timepoint to one or more downstream neighboring nodes. The activate-deactivate state control parameter in the set of inter-node RF beam parameters 524 may allow the central cloud server 102 to dynamically activate or deactivate service antenna arrays on each hybrid analog-digital repeater device at any given time point. This enables flexible resource allocation by powering on only the arrays and corresponding beams required for downstream routing, providing benefits like reduced interference, improved energy efficiency, load balancing across the wire- less backhaul mesh network, and redundancy in case of faults.

In accordance with an embodiment, the set of inter-node RF beam parameters 524 may further comprise a beam direction associated with each service beam of RF signals to be communicated from a given service phased antenna array activated based on the activate-deactivate state control parameter. The beam direction parameter in the set of inter-node RF beam parameters 524 may define the azimuth and elevation angles for each service beam transmitted by an activated antenna array towards specific downstream nodes in the wireless backhaul mesh network. This enables precise directional beamforming for maximizing link budget while minimizing interference, adapting beam directions as the mesh topology changes, and enabling advanced beamform- ing techniques for performance optimization.

In accordance with an embodiment, the set of inter-node RF beam parameters 524 may further comprise a specific beam transmit power selected for each service beam of RF signals transmitted at the given timepoint to the one or more downstream neighboring nodes. The specific beam transmit power parameter allows setting an optimized power level for each individual service beam towards downstream nodes based on the path loss, interference conditions etc. This enables link budget optimization while minimizing overall power consumption and interference footprint across the directional wireless backhaul mesh network architecture through judicious variable-power beam pattern design or configuration as compared to omni-powered mesh links. The power levels may be dynamically altered by the central cloud server 102 based on current RSSI, interference, congestion conditions continually reported through the first type of telemetry information 508 and the second type of telemetry information 510.

In accordance with an embodiment, the set of inter-node RF beam parameters 524 may further comprise a specific beam pattern selected for each service beam of RF signals transmitted at the given timepoint to the one or more downstream neighboring nodes. The set of inter-node RF beam parameters 524 may further comprise a list of different beam routing paths for the wireless backhaul network. This parameter allows configuring a specific beam pattern tailored for each individual service beam transmitted towards downstream nodes in the wireless backhaul mesh network. Additionally, it includes maintaining a list of different available beam routing paths across this wireless backhaul mesh network. For example, if the backhaul topology changes due to additions or any UE movement, beam patterns can be dynamically adjusted by the central cloud server 102 and data traffic may be re-routed via alternate paths in case of congestion, outages or changing conditions on certain backhaul links.

In accordance with an embodiment, the central cloud server 102 may be further configured to assign a different weightage to the first type of telemetry information 508 obtained from the plurality of hybrid analog-digital repeater devices 106 with respect to the second type of telemetry information 510 obtained from the master WAP device 104A and the one or more service WAP devices 108 in the determination of the set of intra-node RF beam parameters 522 and the set of inter-node RF beam parameters 524. By assigning different weightages, central cloud server 102 may prioritize one telemetry source over the other depending on the specific beam parameter being optimized. For example, when determining the set of intra-node RF beam parameters 522 (e.g., parameters like phase configurations and beam angles of the donor and service antennas), higher weightage to the repeater's own orientation and vibration information of the first type of telemetry information 508 may be useful to account for any misalignments more accurately than just relying on UE reports in the second type of telemetry information 510. Conversely, for the inter-node RF beam parameters 524 about beam directions towards neighboring nodes, the second type of telemetry information 510 with UE location data may be prioritized over the first type of telemetry information 508. Further, for certain hybrid analog-digital repeater devices of the plurality hybrid analog-digital repeater devices 106, reporting hardware degradations or failures in the first type of telemetry information 508, their weightage may be reduced while the beam parameters are optimized based more on surrounding nodes telemetry information and/or the second type of telemetry information 510 to maintain coverage. The weighted approach allows optimally combining dedicated node-level telemetry with crowd-sourced spatial UE intelligence for reliable, self-healing, user-focused, and context-aware beam configuration, thereby providing resilience and high performance across the entire backhaul mesh network.

The central cloud server 102 may be further configured to cause the plurality of hybrid analog-digital repeater devices 106 to dynamically form a wireless backhaul mesh network among the master WAP device 104A, the plurality of hybrid analog-digital repeater devices 106 and the one or more service WAP devices 108, based on the determined set of intra-node RF beam parameters 522 and the set of inter-node RF beam parameters 524. The central cloud server 102 may be further configured to communicate the set of intra-node RF beam parameters 522 and the set of inter-node RF beam parameters 524 to each hybrid analog-digital repeater device over the WLAN mesh backchannel network 128 for control and configuration purposes. Each of the plurality of hybrid analog-digital repeater devices 106 may then dynamically adjust their internal phase shifter settings and other parameters as per the received set of intra-node RF beam parameters 522. Concurrently, the plurality of hybrid analog-digital repeater devices 106 may coordinate their inter-node beams towards neighboring nodes based on the set of inter-node RF beam parameters 524 to establish the multi-hop backhaul mesh topology. This dynamic centralized coordination combined with the localized enactment by the repeater nodes allows rapidly forming and re-configuring the resilient backhaul fabric in an automated manner.

In accordance with an embodiment, the central cloud server 102 may be further configured to cause the plurality of hybrid analog-digital repeater devices 106 to establish one or more analog data propagation paths in the wireless backhaul mesh network in one or more intermediate frequencies and further establish a backchannel network (e.g., the WLAN mesh backchannel network 128) in the control plane 124 in the wireless backhaul mesh network via a wireless local area network (WLAN) frequency less than the one or more intermediate frequencies. The central cloud server 102 is further configured to establish a multi-layer wireless backhaul mesh network architecture across the plurality of hybrid analog-digital repeater devices 106, the master WAP device 104A, and the one or more service WAP devices 108. A first layer may include the one or more analog data propagation paths operating in intermediate radio frequency bands (e.g., mmWave frequencies or 60 GHz) to relay high-bandwidth data payloads. The one or more analog data propagation paths may be dynamically formed by configuring the plurality of hybrid analog-digital repeater devices 106 to generate steerable RF beams in conformance with the set of intra-node RF beam parameters 522 and the set of inter-node RF beam parameters 524 computed by the central cloud server 102. This enables a self-organizing mesh topology of high-throughput analog links across the multi-hop backhaul segment. Concurrently, a second control plane layer may be instantiated as a lower frequency digital backchannel leveraging wireless local area network (WLAN) technologies operating at carrier frequencies below the intermediate frequencies employed for the analog data propagation paths. The digital backchannel (e.g., the WLAN mesh backchannel network 128) may be established between the central cloud server 102 and the plurality of hybrid analog-digital repeater devices 106 to facilitate out-of-band signaling and telemetry exchange while providing a hardened management interface resilient to the dynamics impacting the primary high-frequency payload channels.

In accordance with an embodiment, the central cloud server 102 may be further configured to re-configure the one or more analog data propagation paths in the wireless backhaul mesh network when the second type of telemetry information 510 indicates a performance change beyond a defined performance range. The central cloud server 102 may continuously monitor the second type of telemetry information 510, which may include real-time wireless link metrics, sensor data, and interference levels across the backhaul network. Based on the analysis of the second type of telemetry information 510, using the neural network model 102B, the central cloud server 102 may be configured to detect if any key performance indicators deviate beyond defined thresholds, indicating a change that may warrant reconfiguration, such as degraded signal quality, predicted blockages from the computer vision, or increased external interference. Upon detecting such events, the central cloud server 102 may recompute the set of intra-node RF beam parameters 522 and the set of inter-node RF beam parameters 524 to mitigate the issue. These updated beam steering vectors, routing paths, and power levels re-computed may then be transmitted to the relevant hybrid analog-digital repeater devices over the digital backchannel. The relevant hybrid analog-digital repeater devices may then dynamically reconfigure their phase shifters and beamforming hardware according to these new parameters, thereby re-establishing high-throughput, resilient analog data propagation paths autonomously while adapting to the changing environment and load conditions.

In accordance with an embodiment, the central cloud server 102 may be further configured to construct a four-dimensional (4D) surrounding environment map indicative of three-dimensional (3D) spatial environment and a temporal change in the 3D spatial environment surrounding each of: the master WAP device 104A, the plurality of hybrid analog-digital repeater devices 106 and the one or more service WAP devices 108. The central cloud server 102 may be configured to construct the 4D surrounding environment map by continuously fusing and processing the multi-modal sensor data streams from the set of onboard sensors 224 on each of the hybrid analog-digital repeater devices 106, as well as data received from the master WAP device 104A and the one or more service WAP devices 108. This may include first synthesizing a unified 3D spatial model representing the geometry and objects in the coverage area by combining the 3D point clouds and visual data from the repeater nodes. The computer vision algorithms may then be used to detect, classify, and track static obstacles and dynamic objects or people's movement in this unified 3D spatial model. The temporal dimension may then be incorporated by continuously updating the 3D model state over time based on the real-time sensor streams, creating a 4D digital twin that models the time-varying changes in the physical surroundings across the network. This 4D spatio-temporal representation enables predictive capabilities in the central cloud server 102, allowing proactive optimizations like forecasting obstructions, planning repeater reconfigurations, and adapting bandwidth allocation based on the predicted future environment states, thereby enhancing reliability, capacity management, and overall performance.

In accordance with an embodiment, the central cloud server 102 may be further configured to update the wireless backhaul mesh network among the master WAP device 104A, the plurality of hybrid analog-digital repeater devices 106 and the one or more service WAP devices 108, based on the temporal change in the 3D spatial environment. The 4D surrounding environment map may provide a predictive model of how the 3D surroundings are expected to evolve over time based on the movements of objects, obstacles, interference sources etc. The neural network model 102B may analyze 4D surrounding environment map data to forecast impending issues that may impact network performance, such as obstructions along current beam paths due to moving objects, variations in traffic load based on people/vehicle movement patterns, or an increase in interference from predicted external source locations. Based on these forecasted events, the central cloud server 102 may proactively recompute the ideal updated configuration parameters, such as new repeater node positions to circumvent blockages, adjusted beam steering vectors to re-route paths, and/or updated power levels and bandwidth allocation. These new optimized parameters for the set of intra-node RF beam parameters 522 set of inter-node RF beam parameters 524 may then be transmitted to the respective hybrid analog-digital repeater devices of the plurality of hybrid analog-digital repeater devices 106. The respective hybrid analog-digital repeater devices may then dynamically reconfigure their hardware (e.g. phase shifters, antenna arrays) based on the updated parameters. Beneficially, high reliability, throughput and QoS may be maintained despite the dynamic conditions, by leveraging the predictive environmental awareness and closed-loop automation between the central server's AI and the software-defined repeater nodes.

In accordance with an embodiment, the central cloud server 102 may be further configured to predict a potential network node failure or the performance degradation beyond the defined threshold among the plurality of network nodes before its occurrence in the wireless backhaul mesh network. The central cloud server 102 using the neural network model 102B, may be configured to analyze the first type of telemetry information 508 and the second type of telemetry information 510 to predict potential network node failures or performance degradation beyond the defined threshold before their occurrence in the wireless backhaul mesh network. In an implementation, the neural network model 102B may be configured to analyze the signal metadata 206A, including timing information, channel state information, signal strength, SNR, and interference levels, to identify patterns or anomalies that may indicate potential performance degradation or failure of a specific network node of the plurality of network nodes. For example, if the signal metadata 206A indicates a consistent increase in interference levels or a gradual decrease in signal strength for a particular network node over time, the neural network model 102B may recognize this pattern as an early warning sign of potential performance issues or failure.

In an implementation, the central cloud server 102 by use of the neural network model 102B may process the surrounding-environment sensed information, such as visual data, Lidar sensor data, and motion tracking data, to identify potential environmental factors that may impact the performance or cause failure of one or more network nodes of the plurality of network nodes. For example, if the motion tracking data indicates that a network node has been physically moved or the visual data shows obstructions near the network node, the neural network model 102B may be configured to interpret such factors as potential risks for performance degradation or failure. Furthermore, the neural network model 102B may be configured to analyze the vibration information and antenna array orientation changes to detect patterns or anomalies that may lead to performance issues or failures. If the vibration information exceeds a certain threshold or the antenna orientation changes for a particular network node, the neural network model 102B may be configured to recognize these anomalies as potential precursors to performance degradation or failure.

In an implementation, the central cloud server 102 by use of the neural network model 102B may be further configured to analyze the second type of telemetry information 510 (UE-related information), such as throughput, latency, packet loss, and channel utilization, to identify patterns or anomalies that may indicate performance degradation or potential failure of the different types of wireless access point devices (i.e., the master WAP device 104A and the one or more service WAP devices 108). For example, if the throughput and latency for UEs connected to a particular access point start to degrade consistently, or if the packet loss and channel utilization levels exceed certain thresholds, the neural network model 102B may be configured to recognize these patterns as early warning signs of potential performance issues or failure of that access point. The neural network model 102B may be trained on historical data and known failure scenarios associated with the different types of telemetry information. By continuously learning from past incidents and analyzing the combination of the first type of telemetry information 508 and the second type of telemetry information 510, the neural network model 102B may identify complex patterns, anomalies, or trends that may indicate an impending node failure or performance degradation beyond a defined threshold.

In accordance with an embodiment, in certain scenarios, it is experimentally observed that the combination of the first type of telemetry information 508 and the second type of telemetry information 510 may provide more accurate prediction than one type of telemetry information alone. In a first example, potential failure due to environmental factors and network congestion may be predicted by the central cloud server 102. In this example, the neural network model 102B may analyze the combination of the following telemetry data. a) the first type of telemetry information 508, which in this may include the environmental sensor data from multiple hybrid analog-digital repeater devices in a specific area, indicating a sudden increase in temperature and humidity levels, and the antenna array orientation change information from a subset of the multiple hybrid analog-digital repeater devices in the specific area devices, suggesting a slight tilt in their orientation; b) the second type of telemetry information 510, which in this case may include UE-related information from wireless access point devices connected to the affected hybrid analog-digital repeater devices, showing a significant increase in channel utilization and a decrease in throughput for connected UEs. By analyzing this combination of the first type of telemetry information 508 and the second type of telemetry information 510 telemetry data, the neural network model 102B may synergistically identify a pattern that suggests potential failure or significant performance degradation of the affected hybrid analog-digital repeater devices and the associated wireless access point devices. The neural network model 102B may correlate the sudden increase in temperature and humidity levels with the slight tilt in antenna orientation, indicating potential environmental factors (e.g., strong winds or a small-scale weather event) affecting the devices' performance. Additionally, the increased channel utilization and decreased throughput for connected UEs may be indicative of potential network congestion and degraded performance due to the environmental factors.

In a second example, a potential performance degradation of the service WAP device 108A may be detected by synergistic combination of the first type of telemetry information 508 and the second type of telemetry information 510. The neural network model 102B may analyze the combination of the following telemetry data: a) the first type of telemetry information 508, which in this case may include vibration information from a specific hybrid analog-digital repeater device indicating excessive vibrations beyond a defined threshold; and b) the second type of telemetry information 510 from the service WAP device 108A may indicate UE-related information from the service WAP device 108A connected to the specific hybrid analog-digital repeater device, may indicate an increase in interference levels and retransmission/error rates for connected UEs. By analyzing the combination of excessive vibrations detected by the hybrid analog-digital repeater device and the increased interference levels and error rates experienced by UEs connected to the associated service WAP device 108A, the neural network model 102B may identify a pattern that may indicate potential performance degradation of the wireless access point device due to the vibrations affecting the signal quality and interference levels. If only the first type of telemetry information 508 was analyzed, the excessive vibrations might be interpreted as a localized issue with the hybrid analog-digital repeater device itself. Similarly, if only the second type of telemetry information 510 was considered, the increased interference and error rates could be attributed to various other factors, such as network congestion or environmental interference. However, by combining both types of telemetry information, the central cloud server 102 using the neural network model 102B may correlate the excessive vibrations with the degraded performance experienced by connected UEs, enabling it to predict the potential performance degradation of the service WAP device 108A due to the impact of vibrations on the signal quality and interference levels. Thus, the combination of the first type of telemetry information 508 and the second type of telemetry information 510 provides a more comprehensive view of the network conditions and enables the neural network model 102B to identify complex patterns and correlations that may not be apparent when analyzing either type of telemetry information in isolation.

In accordance with an embodiment, the synergistic combination of the first type of telemetry information 508 and the second type of telemetry information 510 provides several benefits. In a first example, if a given hybrid analog-digital repeater device's orientation data shows a change of a 10° tilt, but the one or more UEs in area report low RSSI, the set of inter-node RF beam parameters 524 may adjust the service beam angles and gains to compensate the low RSSI. In a second example, if a data propagation path among the plurality of hybrid analog-digital repeater devices 106 indicate a high UE throughput (greater than the threshold throughput) but high packet errors, more robust modulation like QPSK could be used instead of 16-QAM to increase robustness. In a third example, if one or more hybrid analog-digital repeater devices detects high interference (greater than a threshold interference) from a specific direction based on UE reports, the central cloud server 102 may be configured to cause the one or more hybrid analog-digital repeater devices to enable a beam pattern that minimizes gain in that direction through nulling. Further, with respect to the donor antenna 220, if the interference level from UEs indicates high interference on the donor signal frequency, the polarization type parameter for the donor beam may be changed to an orientation that may minimize and/or mitigate interference.

Based on the first type of telemetry information 508 and the second type of telemetry information 510, the central cloud server 102 may be further configured to detect a performance degradation beyond a defined threshold of the master WAP device 104A operating in a primary gateway role 514A in the wireless backhaul mesh network for providing internet connectivity and routing traffic in the wireless backhaul mesh network. The master WAP device 104A may play a useful role in the wireless backhaul mesh network, while operating in the primary gateway role 514A. In the primary gateway role 514A, the master WAP device 104A may be responsible for, for example, but not limited to: a) providing internet connectivity to the entire wireless backhaul mesh network, acting as the main entry and exit point for data traffic; and b) routing traffic within the wireless backhaul mesh network, ensuring efficient communication between the plurality of hybrid analog-digital repeater devices 106 and the one or more service WAP devices 108. By continuously monitoring the first type of telemetry information 508 and the second type of telemetry information 510, the central cloud server 102 may be configured to detect when the performance of the master WAP device 104A deteriorates beyond an acceptable level (the defined threshold). This performance degradation may manifest in various forms, such as: a. reduced signal strength or increased interference levels, affecting the quality and reliability of the wireless links; b. increased latency, packet loss, or decreased throughput, impacting on the overall network performance and user experience; c. overloaded or exhausted resources (e.g., CPU, memory, bandwidth or vibration levels) on the master WAP device 104A, hindering its ability to efficiently handle network traffic and management tasks. When the central cloud server 102 detects a performance degradation beyond the defined threshold, it may trigger a series of actions to mitigate the issue and maintain the stability and performance of the wireless backhaul mesh network. These actions may include: a. initiating a failover mechanism to switch the primary gateway role 514A to another suitable device in the network, ensuring uninterrupted internet connectivity and traffic routing; b. redistributing the network load among other devices to alleviate the burden on the degraded master WAP device 104A; c.a. adjusting network parameters, such as signal strength, channel allocation, or routing paths, to optimize the overall network performance and circumvent some operations of the degraded device.

The combination of the first type of telemetry information 508 (from the plurality of hybrid analog-digital repeater devices 106) and the second type of telemetry information 510 (from the master WAP device 104A and the one or more service WAP devices 108) may provide a more comprehensive and reliable approach to detecting performance degradation of the master WAP device 104A compared to using just one type of telemetry information. For example, the combination of different types of telemetry information allows the central cloud server 102 to cross-validate and correlate the data received from different sources. For example, if the first type of telemetry information 508 indicates a deterioration in signal strength or an increase in interference levels in a specific area of the network, the central cloud server 102 can validate this information by checking the corresponding second type of telemetry information 510 from the affected one or more service WAP devices 108 in that area. By correlating the data from both types of telemetry information, the central cloud server 102 may identify patterns, anomalies, or trends that may not be apparent when analyzing just one type of telemetry information in isolation. For instance, if the second type of telemetry information 510 indicates a gradual increase in latency or packet loss for UEs connected to the master WAP device 104A, the central cloud server 102 may proactively investigate the issue by analyzing the corresponding first type of telemetry information 508 from the hybrid analog-digital repeater devices 106A in the vicinity. By detecting performance degradation early, the central cloud server 102 may take proactive measures, such as load balancing, network reconfiguration, or preventive maintenance, to mitigate the impact on the network and user experience. Furthermore, the combination of the different types of telemetry information may enable the central cloud server 102 to identify the root causes of performance degradation more effectively. For example, if the first type of telemetry information 508 indicates a sudden increase in interference levels or a change in environmental factors (e.g., temperature, humidity) in a specific area, the central cloud server 102 can correlate this information with the second type of telemetry information 510 from the affected master WAP device 104A and service WAP devices 108 to determine the potential cause of the performance degradation. By identifying the root causes, the central cloud server 102 may perform targeted actions to address the issue and prevent future occurrences with improved accuracy and reliability.

The central cloud server 102 may be further configured to elect a new master wireless access point device from a plurality of network nodes in the wireless backhaul mesh network based on one or more defined election criteria (e.g., the election criteria 512) when the performance degradation is detected beyond the defined threshold. The new master wireless access point device previously operating in a network role different from the primary gateway role 514A in the wireless backhaul mesh network may be switched to operate in the primary gateway role 514A. The new master wireless access point device may be elected (or selected) based on one or more defined election criteria 512, which may include factors such as signal strength, network node location, user density, and current traffic load. By considering these criteria, the central cloud server 102 may select the most suitable candidate device to take over the primary gateway role 514A. The election process may involve evaluating the signal strength of potential candidate network nodes to ensure better coverage and connectivity, assessing the geographical location of devices to optimize network performance and coverage, considering user density to ensure adequate network capacity in high-demand areas, and analyzing the current traffic load and resource utilization of candidates to maintain optimal performance. This multi-factor election approach may enable the central cloud server 102 to make an informed decision and select the best-suited network node for the primary gateway role 514A. For example, candidate network nodes with higher signal strength may be considered more favorable for the master wireless access point role, as they may provide better coverage and connectivity to other network nodes and UEs. In another example, the central cloud server 102 may assess the bandwidth consumption, number of connected user devices, and resource utilization of each candidate network node. The network node with lower traffic load and more available resources may be prioritized in election, as they may accommodate the additional responsibilities of the master wireless access point role (i.e., the primary gateway role 514A) without compromising performance.

Once the new master wireless access point device is elected, the central cloud server 102 may initiate a seamless role switching process. The newly elected device, which was previously operating in a different network role (e.g., a secondary gateway, a relay node, or a service wireless access point), may be switched to operate in the primary gateway role 514A. This role switch involves transferring the responsibilities and configurations associated with the primary gateway from the degraded master WAP device 104A to the newly elected device. The central cloud server 102 may control the transition to minimize downtime and ensure the continuity of network services for connected UEs. Compared to traditional wireless backhaul mesh networks, where the failure or degradation of the master wireless access point device (i.e., the source node or primary gateway) may cause significant disruption and require manual intervention, the automated election and seamless role switching process in the present disclosure provided by the central cloud server 102 enables the network to quickly recover from performance degradation issues, maintains the network's reliability and availability, and ensures a high-quality and uninterrupted service to connected UEs. This self-healing and resilience capability enhances the overall robustness and adaptability of the wireless backhaul mesh network, making it more efficient and user-friendly compared to known technologies.

In accordance with an embodiment, the one or more defined election criteria (e.g., the election criteria 512) comprise two or more of: a signal strength, a network node location, a user density, and a current traffic load. The central cloud server 102 may utilize the one or more defined election criteria 512 to select the most suitable candidate network node for the new master wireless access point device when performance degradation is detected in the current master WAP device 104A. The central cloud server 102 may evaluate the signal strength of potential candidate network nodes to ensure that the newly elected master wireless access point device has a strong and reliable wireless connection. Candidate network nodes with higher signal strength as compared to other network nodes may be preferred because they can provide better coverage, improved data transmission quality, and more stable connectivity to other network nodes and UEs. The network node location refers to the geographical position of a network node within the wireless backhaul mesh network. The central cloud server 102 may consider the physical location of candidate network nodes when electing the new master wireless access point device. The central cloud server 102 may evaluate factors such as the proximity to other network nodes, the distribution of devices across the coverage area, and the overall network topology. The user density may refer to the number of UEs or clients within a specific area served by a network node. The central cloud server 102 may assess the user density in the areas covered by the candidate network nodes and the potential demand for network resources in each area. The current traffic load refers to the amount of data traffic currently being handled by a network node, including the bandwidth consumption and the number of active connections. By selecting a network node with sufficient capacity and resources, the central cloud server 102 ensures that the newly elected master wireless access point device can handle the increased traffic demands and maintain optimal network performance.

The central cloud server 102 may be further configured to reassign one or more network nodes previously connected to the master WAP device 104A to corresponding neighboring network nodes. When the central cloud server 102 detects performance degradation in the master WAP device 104A and elects a new master wireless access point device, the central cloud server 102 may further reassign one or more network nodes that were previously connected to the degraded master WAP device 104A to corresponding neighboring network nodes. The selection of the neighboring network nodes may be based on factors such as, signal strength at the neighboring node, capacity and resource availability at the neighboring node to accommodate the additional traffic and connections from the reassigned node without compromising its own performance, network topology as the neighboring node located in close proximity to the affected node and having a compatible network topology may be selected to facilitate efficient communication and minimize signal interference. Once the corresponding neighboring network nodes are selected, the central cloud server 102 may update the network configurations of the affected nodes and the neighboring nodes, where the affected nodes may be reconfigured to establish connections with their assigned neighboring nodes, redirecting their traffic and communication through these new paths. The neighboring nodes may also be updated to accept and handle the additional connections and traffic from the reassigned nodes.

The central cloud server 102 may be further configured to re-configure the wireless backhaul mesh network based on the elected new master wireless access point device and the reassigned one or more network nodes to maintain an uninterrupted network connectivity and minimize disruptions to one or more user equipment (UEs) 110 served in the wireless backhaul mesh network. The central cloud server 102 may be configured to modify the logical and physical connections between the network nodes to reflect the new hierarchy and communication paths. The central cloud server 102 may configure the newly elected master wireless access point, for example, by assigning network settings, routing information, security configurations, and setting up interfaces and protocols for communication with the external network (e.g., the internet) and the internal network nodes, to enable the new master wireless access point device to function in the primary gateway role 514A. The central cloud server 102 may further adjust various network parameters to optimize the performance and reliability of the re-configured wireless backhaul mesh network, such as settings such as channel allocation, transmission power, and quality of service (QoS) parameters may be adjusted to ensure efficient and interference-free communication among the network nodes. The central cloud server 102 may propagate the configuration changes to all the relevant network nodes in the wireless backhaul mesh network. For example, the central cloud server 102 may send updated configuration files, settings, and instructions to the network nodes, including the newly elected master wireless access point device, the reassigned nodes, and other affected node (s). After the re-configuration, the central cloud server 102 may continuously monitor the performance and health of the wireless backhaul mesh network using the first type of telemetry information 508 and the second type of telemetry information 510 to identify any potential issues or optimize the network configuration, such as adjusting routing paths, load balancing, or resource allocation, to maintain optimal network performance.

In accordance with an embodiment, the central cloud server 102 may be further configured to change a role assignment of a first hybrid analog-digital repeater (e.g., the hybrid analog-digital repeater device 106B) of the plurality of hybrid analog-digital repeater devices 106 from a first network role to a second network role among a plurality of defined network roles 514 in the wireless backhaul mesh network. The plurality of defined network roles 514 in the wireless backhaul mesh network comprises two or more of: the primary gateway role 514A, a service wireless access point role 514B, a switch node role 514C, a root node role 514D, or an access node role 514E. The primary gateway role 514A may be responsible for connecting the wireless backhaul mesh network to the external network (e.g., the internet) and routing traffic between the wireless backhaul mesh network and the external network. The service wireless access point role 514B may be assigned to network nodes that provide wireless access and connectivity to end-user devices (such as the one or more UEs 110) within the wireless backhaul mesh network. The one or more service WAP devices 108 operating in the service wireless access point role 514B may be responsible for handling the wireless communication and data exchange between the end-user devices (such as the one or more UEs 110) and the UEs and the wireless backhaul mesh network. In some implementations, the service wireless access point role 514B may further perform QoS management and user authentication, for example, under the control of the central cloud server 102. In the switch node role 514C, a network node (e.g., the hybrid analog-digital repeater device 106B) may act as a radio frequency (RF) bridge between an upstream neighboring network node and a plurality of downstream neighboring network nodes. In the switch node role 514C, the network node may be responsible for forwarding the received RF beams from the donor antenna 226 to the appropriate service antenna of the one or more service phased antenna arrays 222A, 222B, and 222C. The switch node role 514C may be further responsible to connect to multiple neighboring nodes, forming a multi-hop network topology and route data frames to different neighboring nodes, ensuring efficient and reliable data transmission across wireless backhaul mesh network. The root node role 514D may be assigned to one or more network nodes that serve as the root or the top-level node in a hierarchical or tree-like network topology responsible for aggregating traffic from downstream nodes and forwarding it towards the primary gateway, such as the master WAP device 104A. In the root node role 514D, a given network node may maintain the overall network structure and ensure efficient data flow from the edge nodes (e.g., different network nodes) to the core network (e.g., the primary gateway). The access node role 514E may be similar to that of the service wireless access point role 514B in that such nodes may provide connectivity to end-user devices (UEs) at the edge of the wireless backhaul mesh network but may not have WLAN antennas and may employ phased array antennas for communication in different beam patterns as per number of users to be served and distance of users from the access node. In accordance with an embodiment, the central cloud server 102 may be further configured to change the role assignment of a hybrid analog-digital repeater device from one role to another based on various factors, such as network topology changes (e.g., if the network topology evolves or if new nodes may be added or removed, the central cloud server 102 may reassign roles to optimize the network structure and data flow), performance optimization (e.g., if certain nodes may be experiencing high traffic load or congestion, the central cloud server 102 may change their roles to distribute the load more evenly across the network), fault tolerance and redundancy (e.g. if a network node fails or becomes unreachable, the central cloud server 102 may reassign roles to maintain network connectivity and minimize disruptions), or service requirements (e.g., depending on the specific service requirements or application demands, the central cloud server 102 may assign different roles to nodes to ensure optimal performance and quality of service). The ability to change role assignments dynamically provides significant benefits to the wireless backhaul mesh network, by improving the wireless backhaul mesh network's performance, scalability, and resilience. Moreover, by assigning different roles to nodes, the central cloud server 102 may prioritize and allocate resources based on specific service requirements, ensuring that critical applications receive the necessary performance and quality of service.

In an implementation, the central cloud server 102 may be further configured to communicate a first role reassignment instruction set to the first hybrid analog-digital repeater (e.g., the hybrid analog-digital repeater device 106B) (e.g., the hybrid analog-digital repeater device 106B) configured as a switch node in a switch node role 514C to switch operation from the switch node role 514C to an access node role 514E based on the one or more defined election criteria (e.g., the election criteria 512). In this implementation, the hybrid analog-digital repeater device 106B may be currently configured as a switch node in the switch node role 514C. The central cloud server 102 may continuously monitor and evaluate the network conditions and performance based on the election criteria 512, which may include factors such as network topology, traffic load, signal strength, node capabilities, and service requirements. When the central cloud server 102 determines that the hybrid analog-digital repeater device 106B is to be switched from the switch node role 514C to the access node role 514E, it may generate a specific role reassignment instruction set using the role reassignment instructions generator 516 including configuration parameters, settings, and commands required for the transition. The first role reassignment instruction set may then be securely communicated to the hybrid analog-digital repeater device 106B over a secure communication channel via the backchannel network (e.g., the WLAN mesh backchannel network 128) in the control plane 124. Upon receiving the first role reassignment instruction set, the hybrid analog-digital repeater device 106B may initiate the process of switching its operation from the switch node role 514C to the access node role 514E. The hybrid analog-digital repeater device 106B may apply the received configuration parameters and settings, adjusts its wireless interfaces and routing tables, and establishes the necessary connections with neighboring nodes as per the access node role requirements. The hybrid analog-digital repeater device 106B may also perform any required software or firmware updates to support the new role's functionality. After successfully switching to the access node role 514E, the hybrid analog-digital repeater device 106B may send a confirmation message back to the central cloud server 102, which updates its network inventory and topology records to reflect the new role and continues to monitor the performance and operation of the hybrid analog-digital repeater device 106B in its new role. This dynamic role reassignment capability of the central cloud server 102 enhances the flexibility, adaptability, and efficiency of the wireless backhaul mesh network, ultimately leading to improved network performance and user experience.

In another implementation, the central cloud server 102 may be further configured to communicate a second role reassignment instruction set to the first hybrid analog-digital repeater (e.g., the hybrid analog-digital repeater device 106B) (e.g., the hybrid analog-digital repeater device 106B) configured as a switch node in a switch node role 514C to switch operation from the switch node role 514C to a root node role 514D. In this implementation, the central cloud server 102 may assess the network conditions and requirements, considering factors such as network topology, traffic patterns, and performance metrics. Based on this assessment, the central cloud server 102 may determine that the hybrid analog-digital repeater device 106B, currently operating as a switch node in the switch node role 514C, is to be reassigned to the root node role 514D. To initiate the role reassignment, the central cloud server 102 may generate and send the second role reassignment instruction set to the hybrid analog-digital repeater device 106B. This instruction set may include configuration parameters, settings, and commands required for the hybrid analog-digital repeater device 106B to transition from the switch node role 514C to the root node role 514D. Upon receiving the second role reassignment instruction set, the hybrid analog-digital repeater device 106B may begin the process of switching its operation to the root node role 514D. It may reconfigure its internal settings, adjust its routing tables or information, and establish the necessary connections with its child nodes and upstream nodes in accordance with the root node role requirements. As a root node, the hybrid analog-digital repeater device 106B may take on the responsibility of aggregating traffic from its child nodes and forwarding it efficiently to the primary gateway (the newly elected master WAP device) and vice versa. Throughout the role reassignment process, the central cloud server 102 may closely monitor the hybrid analog-digital repeater device 106B to ensure a seamless transition. The ability of the central cloud server 102 to dynamically reassign roles, such as transitioning the hybrid analog-digital repeater device 106B from a switch node to a root node, provides flexibility and adaptability to the wireless backhaul mesh network, ultimately enhancing the overall efficiency and reliability of the wireless backhaul mesh network.

In accordance with an embodiment, the central cloud server 102 may be further configured to propagate a self-healing instruction set to a set of network nodes predicted for the potential network node failure or the performance degradation beyond the defined threshold, wherein the self-healing instruction set comprises detection and self-recovery instructions to proactively prevent or reduce the performance degradation in the set of network nodes. The detection instructions may enable the network nodes to continuously monitor their health status, analyze key performance indicators, and detect any anomalies or deviations from defined normal state operating conditions. Additionally, the detection instructions may include a learn instruction that may learn from historical data and adapt to changing network conditions locally, improving the accuracy and speed of failure prediction over time. Once a potential issue is detected, the self-recovery instructions may guide the network nodes through a series of corrective actions and self-healing procedures. These instructions may include automatic configuration adjustments, dynamic resource allocation, failover and redundancy mechanisms, and self-repair routines. In addition to the self-healing instructions, the central cloud server 102 may be further configured to provide regular updates and enhancements to the self-healing instruction set. As new failure scenarios or performance issues are identified, the central cloud server 102 may analyze the collected data, develop improved detection and recovery techniques using the neural network model 102B, and distribute these updates to the network nodes. This continuous improvement process ensures that the self-healing mechanisms remain effective and up to date, adapting to the evolving needs and challenges of the wireless backhaul mesh network.

In accordance with an embodiment, the central cloud server 102 may be further configured to periodically execute a distributed self-healing operation in which an intra-node self-healing instruction and an inter-node self-healing instruction is communicated to each network node of the plurality of network nodes to cause each network node of the plurality of network nodes to cross-talk and coordinate with each other to detect and resolve the performance degradation at each network node or a neighboring network node independent of the central cloud server 102. In this embodiment, the central cloud server 102 may be configured to periodically execute a distributed self-healing operation that empowers the network nodes to independently detect and resolve performance degradation issues without relying on constant intervention from the central cloud server 102. This distributed self-healing operation may involve the intra-node self-healing instruction and the inter-node self-healing instruction. The intra-node self-healing instruction may be a set of instructions that enable each network node to monitor its own performance, detect any anomalies or degradations, and initiate self-recovery procedures autonomously. This instruction may be periodically communicated to each network node by the central cloud server 102, ensuring that all nodes have the latest self-healing capabilities. The intra-node self-healing instruction may include real-time performance monitoring, anomaly detection, root cause analysis, and self-recovery routines or instructions tailored to the specific hardware and software characteristics of each network node. The inter-node self-healing instruction may be a set of protocols and communication mechanisms or control instructions that allow the network nodes to collaborate and coordinate with each other to detect and resolve performance degradation issues in a distributed manner. This instruction may be periodically disseminated by the central cloud server 102 to all network nodes, enabling them to establish a peer-to-peer communication framework. Through this framework, the network nodes may engage in crosstalk, sharing information about their performance status, detected anomalies, and successful recovery strategies. The inter-node self-healing instruction may facilitate various forms of coordination among the network nodes. For example, if a network node detects performance degradation within itself, it may reach out to its neighboring nodes to gather additional information or request assistance in resolving the issue. The neighboring nodes may share their own performance metrics, suggest configuration adjustments, or even temporarily take over some of the workload to alleviate the burden on the affected node. This collaborative approach allows the network nodes to leverage their collective intelligence and resources to address performance issues more effectively. Furthermore, the inter-node self-healing instruction may enable the network nodes to proactively monitor the performance of their neighboring nodes. If a node detects performance degradation in a neighboring node, it may initiate a cooperative recovery process. This may involve sharing diagnostic information, proposing corrective actions, or redistributing traffic to minimize the impact of the degradation. By actively monitoring and assisting each other, the network nodes can quickly identify and resolve performance issues before they escalate and affect the overall network performance. The distributed self-healing operation, combining the intra-node self-healing instruction and the inter-node self-healing instruction, may reduce dependence on the central cloud server by empowering the network nodes to independently detect and resolve performance issues, the distributed self-healing operation reduces the reliance on the central cloud server 102 for constant monitoring and intervention.

For example, the wireless backhaul mesh network managed by the central cloud server 102 may experience performance degradation issues due to excessive vibration in one of its nodes, Node X. The central cloud server 102 may periodically communicate the intra-node self-healing instruction set to each network node, including Node X, which may be equipped with vibration sensors and the intra-node self-healing instruction set. The intra-node self-healing instruction set may be executed to continuously monitor and analyze the vibration data, comparing real-time patterns against historical data and predefined thresholds to detect anomalies. In the event of a significant increase in vibration levels exceeding the normal operating range, the intra-node self-healing instruction may trigger Node X to initiate self-recovery procedures. Node X may analyze the vibration data and determine that the excessive vibration is causing signal degradation and packet loss. As a first step, Node X may adjust its transmission power and modulation scheme to compensate for the signal degradation caused by the vibration. Additionally, Node X may activate its built-in vibration damping mechanisms to reduce the impact of the excessive vibration on its hardware components. Furthermore, the central cloud server 102 may periodically disseminate the inter-node self-healing instruction to all network nodes, including Node X and its neighboring nodes, Node Y and Node Z. This instruction may enable Node X to communicate its vibration-related performance degradation and self-recovery actions to Node Y and Node Z. Node Y, being in close proximity to Node X, may detect that it is also experiencing increased packet loss due to the vibration-induced signal degradation from Node X. Leveraging the insights shared by Node X, Node Y may adjust its own transmission power and modulation scheme to maintain a stable link with Node X. Node Z, located further away from Node X, may determine that it can serve as a relay node to help route traffic around Node X, reducing the impact of the vibration-related performance degradation. As the nodes collaborate and implement their self-healing actions, they may continuously monitor the impact of these changes on their performance and share the collected data as part of telemetry information with the central cloud server 102. The central cloud server 102 may then aggregate and analyze the data to refine and update the self-healing instructions, enabling the nodes to learn from their experiences and adapt their strategies accordingly.

In accordance with an embodiment, the central cloud server 102 may be further configured to drop participation of a hybrid analog-digital repeater device in the wireless backhaul mesh network when a vibration in the hybrid analog-digital repeater device may be above a threshold vibration value indicated in the obtained first type of telemetry information 508. In a case where the hybrid analog-digital repeater device may be experiencing excessive vibrations beyond the threshold vibration value, it may indicate that the hybrid analog-digital repeater device may have become highly unstable or misaligned. Including such an unreliable node in routing paths and beam calculations may degrade the overall backhaul performance. Thus, by proactively dropping participation of the hybrid analog-digital repeater device in the user data propagation or routing paths, the central cloud server 102 may re-configure the beam routing paths and parameters across the remaining stable repeater nodes. This allows self-healing of the wireless mesh topology and maintain robust connectivity.

In accordance with an embodiment, the central cloud server 102 may be further configured to dynamically reassign two or more network nodes previously connected to the hybrid analog-digital repeater device to neighboring network nodes of each of the two or more network nodes except the hybrid analog-digital repeater device. The central cloud server 102 may generate and communicate reassignment instructions to the affected network nodes and the selected neighboring network nodes. The reassignment instructions may include information such as the new connectivity pattern, updated routing tables or information, and any necessary configuration changes. The network nodes may then establish connections with their newly assigned neighboring nodes, bypassing the problematic hybrid analog-digital repeater device.

In accordance with an embodiment, the central cloud server 102 may be further configured to control the plurality of hybrid analog-digital repeater devices 106 to configure and re-configure a variety of repeater parameters, such as the transmit power, beamforming direction, and modulation scheme. This allows for the optimization of the network for different deployment scenarios. The central cloud server 102 may be further configured to remotely monitor the performance of the plurality of hybrid analog-digital repeater devices 106 for early detection of any potential network issues, such as interference or blockages, and the rapid deployment of corrective actions communicated as updated configuration or in the form of the set of intra-node RF beam parameters 524 or the inter-node RF beam parameters 524. The central cloud server 102 may be further configured to update the firmware of the plurality of hybrid analog-digital repeater devices 106 in the network over the air. This allows for the rapid deployment of new features and bug fixes, without the need for manual intervention. The centralized controller, such as the central cloud server 102 may propagate configuration updates to individual nodes for localized enactment over the digital backchannel. This helps coordinate the multi-band topology with mmWave NR-U for capacity 5G access and Wi-Fi® 7 for reliable control.

In accordance with an embodiment, the central cloud server may be further configured to remotely boot the plurality of hybrid analog-digital repeater devices 106 and synchronize timing over the air, leverage dual polarization to inject test signals, and analyze test metrics to calibrate configurations for each of the plurality of hybrid analog-digital repeater devices 106. Further, synchronizing timing references over the air from the central cloud server 102 may ensure precise timing alignment across the plurality of hybrid analog-digital repeater devices 106 in the distributed mesh architecture. Furthermore, leveraging dual polarization to inject test synchronization signal block (SSB) signals allows the central cloud server 102 to conduct comprehensive in-service testing and calibration of the active backhaul links without disrupting operational user traffic. By analyzing the test metrics obtained from the injected SSB signals, the central cloud server 102 may accurately measure and characterize the performance of each backhaul link. This test data feeds into the telemetry-driven analytics to continually fine-tune and recalibrate the intra-node and inter-node beam parameters for optimal backhaul operations. This ability to repeatedly test, measure and self-calibrate the backhaul links transforms the wireless mesh from a static deployment to a self-optimizing and self-healing architecture that can recover from disruptions or degradations by reconfiguring beam parameters based on the latest calibrated measurements from the central cloud server 102.

Figure 6:
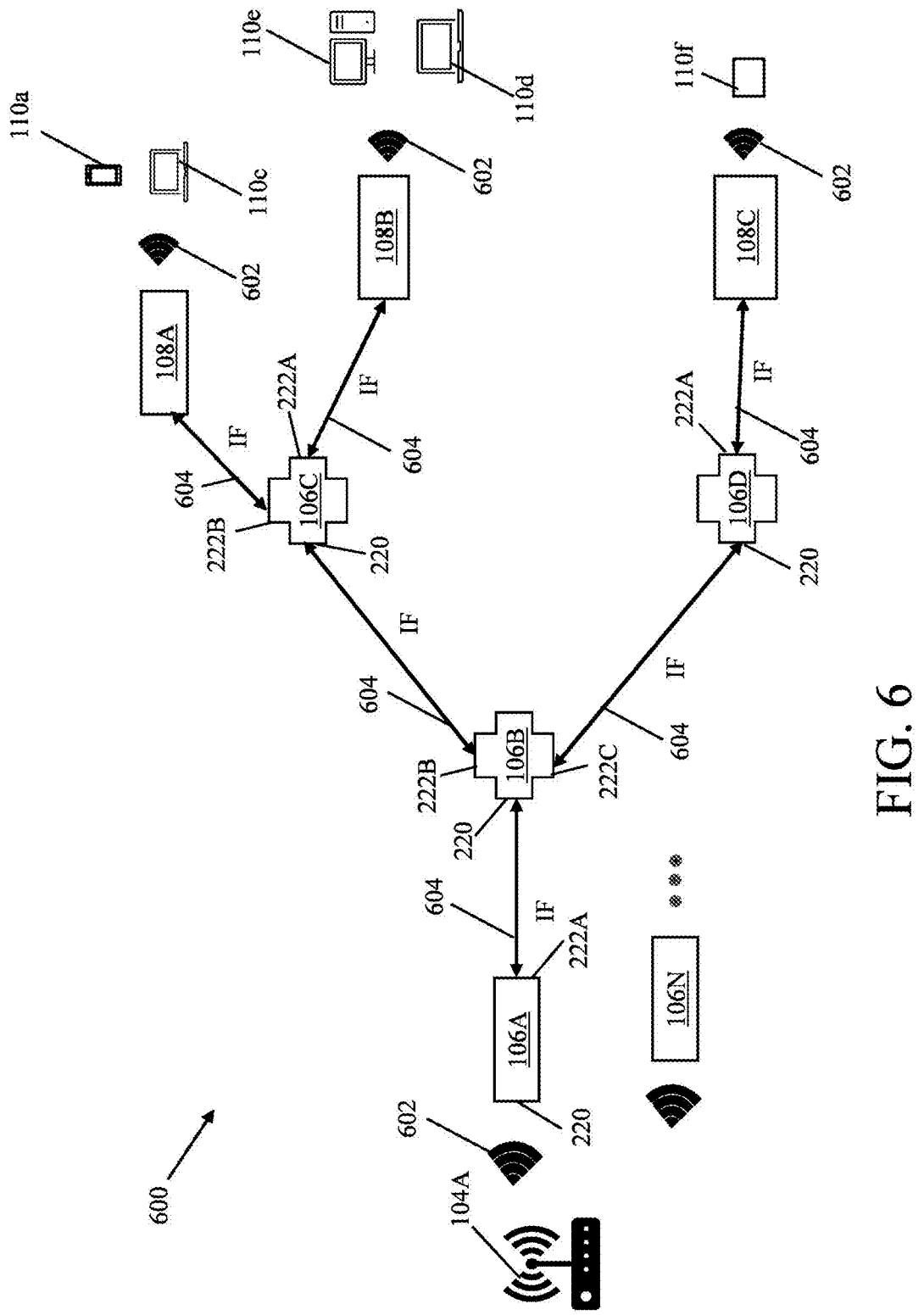
FIG. 6 is a diagram that illustrates an exemplary implementation of a wireless communication system for telemetry information-based network role reassignments in a wireless backhaul mesh network for high-performance, low latency, and ultra-reliable communication, in accordance with an exemplary embodiment of the disclosure.

FIG. 6 is a diagram that illustrates an exemplary implementation of a wireless communication system for telemetry information-based network role reassignments in a wireless backhaul mesh network for high-performance, low latency, and ultra reliable communication, in accordance with an exemplary embodiment of the disclosure. FIG. 6 is explained in conjunction with elements from FIGS. 1A, 1B, 1C, 2A, 2B, 3, 4, and 5. With reference to FIG. 6, there is shown an exemplary wireless communication system 600 that includes the master WAP device 104A, a wireless backhauls mesh network of the hybrid analog-digital repeater devices 106A, 106B, 106D, and 106N, and the service WAP devices 108A, 108B, and 108C.

In operation, the master WAP device 104A may be configured to communicate the second type of telemetry information 510 to the central cloud server 102. The central cloud server 102 may be configured to control the master WAP device 104A to communicate a WLAN signal 602 in a first WLAN frequency from the data source 112. In an implementation, the first WLAN frequency may be in a range of 6-9 GHz (e.g., Wi-Fi® 6, 7, 8). The master WAP device 104A may be at a first location. The plurality of hybrid analog-digital repeater devices 106 may be disposed at a plurality of different locations. Each of the plurality of hybrid analog-digital repeater devices 106 may be configured to communicate the first type of telemetry information 508 to the central cloud server 102. The hybrid analog-digital repeater device 106A may be configured to receive the WLAN signal 602 from the master WAP device 104A via the donor antenna 220 (which may be a WLAN antenna or a phase array antenna connected to a WLAN Fast Ethernet (FE) port. The hybrid analog-digital repeater device 106A may utilize the frequency converter 218 to convert the WLAN signal 602 to a beam of RF signals 604 in an intermediate frequency band (e.g., mmWave frequencies or other intermediate frequencies in the range of 10-300 GHz). The frequency converter 218 may perform frequency up conversion by frequency mixing of the WLAN signal 602 with a local oscillator signal, generating an intermediate frequency for improved wireless communication performance. The intermediate frequency band information may be communicated by the central cloud server 102 to the hybrid analog-digital repeater device 106A. The beam of RF signals 604 in the intermediate frequency band may be a mmWave frequency in a range of 10-300 GHz or other intermediate frequency in a range of 10-300 GHz. The first intermediate frequency band of the first beam of RF signals 604 may be a licensed mmWave spectrum of a network operator or an unlicensed mmWave spectrum. The hybrid analog-digital repeater device 106A may be a root node that may then relay the beam of RF signals 604 in the intermediate frequency band to one or more second hybrid analog-digital repeater devices (e.g., the hybrid analog-digital repeater devices 106B and 106N) of the plurality of hybrid analog-digital repeater devices 106.

In this case, the beam of RF signals 604 may be relayed to the hybrid analog-digital repeater device 106B based on routing instruction received from the central cloud server 102. The hybrid analog-digital repeater device 106B may be configured as a switch node that may receive the incoming beam of mmWave signal (i.e., the beam of RF signals 604) via the donor antenna 220 from a first direction from the upstream node (i.e., the hybrid analog-digital repeater device 106A). In the switch node configuration, the donor antenna 220 may be implemented as a phase array antenna configured to receive a narrow beam, i.e., the beam of RF signals 604 via the donor antenna 220 and concurrently route the beam of RF signals 604 two or more downstream nodes in two or more different directions based on instruction and coordination from the central cloud server 102. In this case, the RF switch circuit 212 (of FIG. 2) may be configured to switch the beam of RF signals 604 to the two service phased antenna arrays 222B and 222C of the hybrid analog-digital repeater device 106B to concurrently route two parallel beams of RF signals 604 to two downstream nodes (e.g., the hybrid analog-digital repeater devices 106C and 106D) in two different directions. The two service phased antenna arrays 222B and 222C may be arranged at different positions and orientations with respect to each other and with respect to the donor antenna 220. In other words, one or more of the plurality of hybrid analog-digital repeater devices 106 may be configured to concurrently route an incoming beam of RF signal in the intermediate frequency (e.g., mmWave signal) received from an upstream node in a first direction to two or more downstream nodes in two or more different directions under the control of the central cloud server 102. Each of the plurality of hybrid analog-digital repeater devices 106 may be equipped with the set of amplifiers 210 (e.g., power amplifiers) and the set of phase shifters 208, which enhances the mmWave signal and relays across the hybrid analog-digital repeater devices 106A, 106B, 106C, and 106D over longer distances.

The service WAP devices 108A may be configured to receive, via the phase array antenna 416, the first beam of RF signals 604 in the intermediate frequency band from the service phased antenna array 222B of the hybrid analog-digital repeater devices 106C and convert the first beam of RF signals 604 back to the WLAN signal 602 in the first WLAN frequency (e.g., Wi-Fi® 6, 7, or 8, i.e., within 6-9 GHz frequency range) using the frequency converter 410 and based on control instruction (e.g., the set of intra-node RF beam parameters 524 received from the central cloud server 102). The frequency converter 410 may be used to down convert the first beam of RF signals 604 in the intermediate frequency band to the first WLAN frequency to serve to its connected UEs 110a and 110c in a data throughput greater than a threshold throughput, for example, in multi-gigabit data rate. Similarly, the service WAP devices 108B may be configured to receive the first beam of RF signals 604 in the intermediate frequency band from the service phased antenna array 222A of the hybrid analog-digital repeater devices 106C and convert the first beam of RF signals 604 back to the WLAN signal 602 in the first WLAN frequency (e.g., Wi-Fi® 6, 7, or 8, i.e., within 6-9 GHz frequency range) to serve to its connected UEs 110d and 110e. The service WAP devices 108C may be configured to receive the first beam of RF signals 604 in the intermediate frequency band from the service phased antenna array 222A of the hybrid analog-digital repeater devices 106D and convert the first beam of RF signals 604 back to the WLAN signal 602 in the first WLAN frequency (e.g., Wi-Fi® 6, 7, or 8, i.e., within 6-9 GHz frequency range) to serve to its connected UE 110f (e.g., a client device, smart TV, or a CPE) based on the set of intra-node RF beam parameters 524 received from the central cloud server 102. The hybrid analog-digital repeater devices 106A to 106D extends the coverage area of the master WAP device 104A and the one or more service WAP devices 108, with a negligible latency even though user data passes through multiple hops. The hybrid analog-digital repeater devices 106A to 106D may be disposed as a radio frequency (RF) bridge between the master WAP device 104A and the service WAP devices 108A, 108B, and 108C such that a data propagation path of user data relayed through a network of the hybrid analog-digital repeater devices 106A to 106D may be analog without any digital decoding or encoding of the user data in the first beam of RF signals 604 to reduce latency less than a threshold time, in the order of nanoseconds. Further, a backchannel connectivity and control of the network of the hybrid analog-digital repeater devices 106A to 106D may be via a second WLAN frequency (e.g., 2.4 GHz or 5 GHz) frequency. The backchannel connectivity and control of the network of the hybrid analog-digital repeater devices 106A to 106D may be based on the signal metadata 206A of the first beam of RF signals 604. The second WLAN frequency may be less than the first WLAN frequency. In the upstream communication 116, the service WAP devices 108A, 108B, and 108C may be configured to acquire RF signals from its corresponding UEs and pack the user data back to the master WAP device 104A via the hybrid analog-digital repeater devices 106A to 106D. The central cloud server 102 may be further configured to elect a new master wireless access point device (e.g., the hybrid analog-digital repeater devices 106N) from a plurality of network nodes in the wireless backhaul mesh network based on the election criteria 512 when the performance degradation of the master WAP device 104A is detected beyond the defined threshold, where the new master wireless access point device previously operating in a network role (e.g., a backup primary gateway or a switch node with also the primary gateway capability and access to Internet) different from the primary gateway role 514A in the wireless backhaul mesh network is switched to operate in the primary gateway role 514A.

FIGS. 7A, 7B, 7C, and 7D, collectively, is a flowchart of a method for telemetry information-based network role reassignments in a wireless backhaul mesh network for high-performance, low latency, and ultra reliable communication, in accordance with an embodiment of the disclosure. FIGS. 7A to 7D are explained in conjunction with elements from FIGS. 1A, 1B, 1C, 2A, 2B 3, 4, and 5. With reference to 7A, 7B, 7C, and 7D, there is shown a flowchart of a method 700 comprising exemplary operations 702 through 734. The method 700 may be implemented in the central cloud server 102 of the wireless communication system 100A, 100C, or 600.

At 702, the first type of telemetry information 508 may be obtained from the plurality of hybrid analog-digital repeater devices 106. In accordance with an embodiment, the first type of telemetry information 508 obtained from the plurality of hybrid analog-digital repeater devices 106 (for example, as described in FIG. 5).

At 704, the second type of telemetry information 510 may be obtained from the master WAP device 104A and the one or more service WAP devices 108. In accordance with an embodiment, the second type of telemetry information 510 obtained from the master WAP device 104A and the one or more service WAP devices 108 may comprise user equipment (UE) related information of one or more UEs wirelessly connected to a corresponding wireless access point pertaining to the master WAP device 104A and the one or more service WAP devices 108.

At 706, a different weightage may be assigned to the first type of telemetry information 508 obtained from the plurality of hybrid analog-digital repeater devices 106 with respect to the second type of telemetry information 510 obtained from the master WAP device 104A and the one or more service WAP devices 108 in determination of one or more intra-node RF beam parameters and the one or more inter-node RF beam parameters.

At 708, one or more intra-node radio frequency (RF) beam parameters (e.g., the set of intra-node RF beam parameters 522) and one or more inter-node RF beam parameters (e.g., the set of inter-node RF beam parameters 524) may be determined for each of the plurality of hybrid analog-digital repeater devices 106 based on the first type of telemetry information 508 and the second type of telemetry information 510, where the plurality of hybrid analog-digital repeater devices 106 may be disposed as a RF bridge between the master WAP device 104A and the one or more service WAP devices 108.

At 710, the plurality of hybrid analog-digital repeater devices 106 may be caused to dynamically form a wireless backhaul mesh network among the master WAP device 104A, the plurality of hybrid analog-digital repeater devices 106 and the one or more service WAP devices 108, based on the determined one or more intra-node RF beam parameters (e.g., the set of intra-node RF beam parameters 522) and the one or more inter-node RF beam parameters (e.g., the set of inter-node RF beam parameters 524).

At 712, the plurality of hybrid analog-digital repeater devices 106 may be caused to establish one or more analog data propagation paths in the wireless backhaul mesh network in one or more intermediate frequencies.

At 714, the plurality of hybrid analog-digital repeater devices 106 may be caused to establish a backchannel network (e.g., the WLAN mesh backchannel network 128) in the control plane 124 in the wireless backhaul mesh network via a wireless local area network (WLAN) frequency less than the one or more intermediate frequencies.

At 716, a potential network node failure or the performance degradation beyond the defined threshold among the plurality of network nodes may be predicted before its occurrence in the wireless backhaul mesh network.

At 718, based on the first type of telemetry information 508 and the second type of telemetry information 510, a performance degradation may be detected beyond a defined threshold of the master WAP device 104A operating in a primary gateway role 514A in the wireless backhaul mesh network for providing internet connectivity and routing traffic in the wireless backhaul mesh network.

At 720, a new master wireless access point device may be elected from a plurality of network nodes in the wireless backhaul mesh network based on one or more defined election criteria (e.g., the election criteria 512) when the performance degradation is detected beyond the defined threshold, wherein the new master wireless access point device previously operating in a network role different from the primary gateway role 514A in the wireless backhaul mesh network is switched to operate in the primary gateway role 514A.

At 722, one or more network nodes previously connected to the master WAP device 104A may be reassigned to corresponding neighboring network nodes.

At 724, the wireless backhaul mesh network may be re-configured based on the elected new master wireless access point device and the reassigned one or more network nodes to maintain an uninterrupted network connectivity and minimize disruptions to one or more UEs 110 served in the wireless backhaul mesh network.

At 726, a role assignment of a first hybrid analog-digital repeater (e.g., the hybrid analog-digital repeater device 106B) of the plurality of hybrid analog-digital repeater devices 106 may be changed from a first network role to a second network role among the plurality of defined network roles 514 in the wireless backhaul mesh network. The plurality of defined network roles 514 in the wireless backhaul mesh network may include two or more of the primary gateway role 514A, the service wireless access point role 514B, the switch node role 514C, the root node role 514D, or the access node role 514E. The operation 726 may include one or more sub-operations, such as operations 726A and 726B.

At 726A, a first role reassignment instruction set may be communicated to the first hybrid analog-digital repeater (e.g., the hybrid analog-digital repeater device 106B) (e.g., the hybrid analog-digital repeater device 106B) configured as a switch node in the switch node role 514C to switch operation from the switch node role 514C to the access node role 514E based on the one or more defined election criteria (e.g., the election criteria 512).

At 726B, a second role reassignment instruction set may be communicated to the first hybrid analog-digital repeater (e.g., the hybrid analog-digital repeater device 106B) (e.g., the hybrid analog-digital repeater device 106B) configured as a switch node in a switch node role 514C to switch operation from the switch node role 514C to a root node role 514D.

At 728, a self-healing instruction set may be propagated to a set of network nodes predicted for the potential network node failure or the performance degradation beyond the defined threshold, where the self-healing instruction set comprises detection and self-recovery instructions to proactively prevent or reduce the performance degradation in the set of network nodes.

At 730, a distributed self-healing operation may be periodically executed in which an intra-node self-healing instruction and an inter-node self-healing instruction is communicated to each network node of the plurality of network nodes to cause each network node of the plurality of network nodes to cross-talk and coordinate with each other to detect and resolve the performance degradation at each network node or a neighboring network node independent of the central cloud server 102.

At 732, participation of a hybrid analog-digital repeater device in the wireless backhaul mesh network may be dropped when a vibration in the hybrid analog-digital repeater device may be above a threshold vibration value indicated in the obtained first type of telemetry information 508.

At 734, two or more network nodes previously connected to the hybrid analog-digital repeater device may be dynamically reassigned to neighboring network nodes of each of the two or more network nodes except the hybrid analog-digital repeater device (i.e., the hybrid analog-digital repeater device whose participation is dropped).

Various embodiments of the disclosure may provide the wireless communication system 100A, 100C or 600 (FIG. 1A, 1C, or 6). The wireless communication system 100A, 100C or 600 includes the central cloud server 102 configured to obtain the first type of telemetry information 508 from the plurality of hybrid analog-digital repeater devices 106. The central cloud server 102 may be further configured to obtain the second type of telemetry information 510 from the master WAP device 104A and the one or more service WAP devices 108. based on the first type of telemetry information 508 and the second type of telemetry information 510, the central cloud server 102 may be further configured to detect a performance degradation beyond a defined threshold of the master WAP device 104A operating in a primary gateway role 514A in the wireless backhaul mesh network for providing internet connectivity and routing traffic in the wireless backhaul mesh network. The central cloud server 102 may be further configured to elect a new master wireless access point device from a plurality of network nodes in the wireless backhaul mesh network based on one or more defined election criteria (e.g., the election criteria 512) when the performance degradation is detected beyond the defined threshold, wherein the new master wireless access point device previously operating in a network role different from the primary gateway role 514A in the wireless backhaul mesh network is switched to operate in the primary gateway role 514A. The central cloud server 102 may be further configured to reassign one or more network nodes previously connected to the master WAP device 104A to corresponding neighboring network nodes. The central cloud server 102 may be further configured to re-configure the wireless backhaul mesh network based on the elected new master wireless access point device and the reassigned one or more network nodes to maintain an uninterrupted network connectivity and minimize disruptions to one or more user equipment (UEs) 110 served in the wireless backhaul mesh network.

Various embodiments of the disclosure may provide a computer program product for wireless communication, the computer program product comprising a computer-readable storage medium (e.g., a non-transitory computer-readable storage medium) having program instructions embodied therewith, the program instructions are executable by a system to cause the system to execute operations, the operations comprising obtaining the first type of telemetry information 508 from the plurality of hybrid analog-digital repeater devices 106. The operations further comprising obtaining the second type of telemetry information 510 from the master WAP device 104A and the one or more service WAP devices 108. The operations further comprising detecting a performance degradation beyond a defined threshold of the master WAP device 104A operating in a primary gateway role 514A in the wireless backhaul mesh network for providing internet connectivity and routing traffic in the wireless backhaul mesh network, based on the first type of telemetry information 508 and the second type of telemetry information 510. The operations further comprising electing a new master wireless access point device from a plurality of network nodes in the wireless backhaul mesh network based on one or more defined election criteria (e.g., the election criteria 512) when the performance degradation is detected beyond the defined threshold, wherein the new master wireless access point device previously operating in a network role different from the primary gateway role 514A in the wireless backhaul mesh network is switched to operate in the primary gateway role 514A. The operations further comprising reassigning one or more network nodes previously connected to the master WAP device 104A to corresponding neighboring network nodes and re-configuring the wireless backhaul mesh network based on the elected new master wireless access point device and the reassigned one or more network nodes to maintain an uninterrupted network connectivity and minimize disruptions to one or more user equipment (UEs) 110 served in the wireless backhaul mesh network.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A wireless communication system, comprising:
a central cloud server configured to:
   obtain a first type of telemetry information from a plurality of hybrid analog-digital repeater devices;
   obtain a second type of telemetry information from a master wireless access point (WAP) device and one or more service wireless access point devices;
   determine one or more intra-node radio frequency (RF) beam parameters and one or more inter-node RF beam parameters for each of the plurality of hybrid analog-digital repeater devices based on the first type of telemetry information and the second type of telemetry information;
   cause the plurality of hybrid analog-digital repeater devices to dynamically form a wireless backhaul mesh network among the master WAP device, the plurality of hybrid analog-digital repeater devices, and the one or more service WAP devices based on the determined one or more intra-node RF beam parameters and the one or more inter-node RF beam parameters;
   cause the plurality of hybrid analog-digital repeater devices to establish one or more analog data propagation paths in the wireless backhaul mesh network in one or more intermediate frequencies; and
   cause the plurality of hybrid analog-digital repeater devices to establish a backchannel network in a control plane in the wireless backhaul mesh network via a wireless local area network (WLAN) frequency less than the one or more intermediate frequencies.

2. The wireless communication system according to claim 1, wherein the central cloud server is further configured to:
   based on the first type of telemetry information and the second type of telemetry information, detect a performance degradation beyond a defined threshold of the master wireless access point device operating in a primary gateway role in the wireless backhaul mesh network for providing internet connectivity and routing traffic in the wireless backhaul mesh network;
   elect a new master wireless access point device from a plurality of network nodes in the wireless backhaul mesh network based on one or more defined election criteria when the performance degradation is detected beyond the defined threshold,
   wherein the new master wireless access point device previously operating in a network role different from the primary gateway role in the wireless backhaul mesh network is switched to operate in the primary gateway role;
   reassign one or more network nodes previously connected to the master wireless access point device to corresponding neighboring network nodes; and
   re-configure the wireless backhaul mesh network based on the elected new master wireless access point device and the reassigned one or more network nodes to maintain an uninterrupted network connectivity and minimize disruptions to one or more user equipment (UEs) served in the wireless backhaul mesh network,
   wherein the one or more defined election criteria comprise two or more of: a signal strength, a network node location, a user density, and a current traffic load.

3. The wireless communication system according to claim 2, wherein the central cloud server is further configured to change a role assignment of a first hybrid analog-digital repeater of the plurality of hybrid analog-digital repeater devices from a first network role to a second network role among a plurality of defined network roles in the wireless backhaul mesh network.

4. The wireless communication system according to claim 3, wherein the plurality of defined network roles in the wireless backhaul mesh network comprises two or more of: the primary gateway role, a service wireless access point role, a switch node role, a root node role, or an access node role.

5. The wireless communication system according to claim 3, wherein the central cloud server is further configured to communicate a first role reassignment instruction set to the first hybrid analog-digital repeater configured as a switch node in a switch node role to switch operation from the switch node role to an access node role based on the one or more defined election criteria.

6. The wireless communication system according to claim 3, wherein the central cloud server is further configured to communicate a second role reassignment instruction set to the first hybrid analog-digital repeater configured as a switch node in a switch node role to switch operation from the switch node role to a root node role.

7. The wireless communication system according to claim 2, wherein the central cloud server is further configured to predict a potential network node failure or the performance degradation beyond the defined threshold among the plurality of network nodes before occurrence thereof in the wireless backhaul mesh network.

8. The wireless communication system according to claim 7, wherein the central cloud server is further configured to propagate a self-healing instruction set to a set of network nodes predicted for the potential network node failure or the performance degradation beyond the defined threshold, wherein the self-healing instruction set comprises detection and self-recovery instructions to proactively prevent or reduce the performance degradation in the set of network nodes.

9. The wireless communication system according to claim 7, wherein the central cloud server is further configured to periodically execute a distributed self-healing operation in which an intra-node self-healing instruction and an inter-node self-healing instruction are communicated to each network node of the plurality of network nodes to cause each network node of the plurality of network nodes to cross-talk and coordinate with each other to detect and resolve the performance degradation at each network node or a neighboring network node independent of the central cloud server.

10. The wireless communication system according to claim 2, wherein the central cloud server is further configured to:

assign a different weightage to the first type of telemetry information with respect to the second type of telemetry information; and determine the one or more intra-node RF beam parameters and the one or more inter-node RF beam parameters for each of the plurality of hybrid analog-digital repeater devices further based on the assigned different weightage to the first type of telemetry information with respect to the second type of telemetry information.

11. The wireless communication system according to claim 1, wherein the first type of telemetry information obtained from the plurality of hybrid analog-digital repeater devices comprises two or more of: a unique identifier (ID) of each of the plurality of hybrid analog-digital repeater devices, a geo-location of each of the plurality of hybrid analog-digital repeater devices, an operational state of the plurality of hybrid analog-digital repeater devices, and signal metadata of an incoming beam of RF signals at each of the plurality of hybrid analog-digital repeater devices.

12. The wireless communication system according to claim 11, wherein the signal metadata of the incoming beam of RF signals at each of the plurality of hybrid analog-digital repeater devices comprises timing information associated with a radio frame of the incoming beam of RF signals, system information, channel state information, a cell identity (ID), a beam ID, a signal strength, a signal to noise ratio (SNR), an interference level, or other signal quality metrics.

13. The wireless communication system according to claim 11, wherein the first type of telemetry information obtained from the plurality of hybrid analog-digital repeater devices further comprises surrounding-environment sensed information sensed by a set of onboard sensors at each of the plurality of hybrid analog-digital repeater devices, and wherein the surrounding-environment sensed information comprises two or more of: visual information surrounding each of the plurality of hybrid analog-digital repeater devices, light detection and ranging (Lidar) sensor information, and motion tracking data of one or more moving objects surrounding each of the plurality of hybrid analog-digital repeater devices.

14. The wireless communication system according to claim 11, wherein the first type of telemetry information further comprises vibration information indicative of a change in vibration detected at each of the plurality of hybrid analog-digital repeater devices.

15. The wireless communication system according to claim 11, wherein the first type of telemetry information further comprises antenna array orientation change information indicative of a change in an orientation of a donor antenna and one or more service phased antenna arrays of each of the plurality of hybrid analog-digital repeater devices.

16. The wireless communication system according to claim 1, wherein the second type of telemetry information obtained from the master wireless access point device and the one or more service wireless access point devices comprises user equipment (UE) related information of one or more UEs wirelessly connected to a corresponding wireless access point pertaining to the master wireless access point device and the one or more service wireless access point devices.

17. The wireless communication system according to claim 16, wherein the UE related information in the second type of telemetry information comprises a Received Signal Strength Indicator (RSSI), a throughput, a latency, a packet loss measurement, a channel utilization, an interference level, a retransmission or error rate, device information, and location data associated with each UE of the one or more UEs connected to the corresponding wireless access point.

18. The wireless communication system according to claim 1, wherein the central cloud server is further configured to:

drop participation of a hybrid analog-digital repeater device in the wireless backhaul mesh network when a vibration in the hybrid analog-digital repeater device is above a threshold vibration value indicated in the obtained first type of telemetry information; and dynamically reassign two or more network nodes previously connected to the hybrid analog-digital repeater device to neighboring network nodes of each of the two or more network nodes except the hybrid analog-digital repeater device.

19. A method for telemetry information-based network role reassignments, the method comprising:

in a central cloud server:

obtaining a first type of telemetry information from a plurality of hybrid analog-digital repeater devices;

obtaining a second type of telemetry information from a master wireless access point (WAP) device and one or more service wireless access point devices;

determining one or more intra-node radio frequency (RF) beam parameters and one or more inter-node RF beam parameters for each of the plurality of hybrid analog-digital repeater devices based on the first type of telemetry information and the second type of telemetry information;

causing the plurality of hybrid analog-digital repeater devices to dynamically form a wireless backhaul mesh network among the master WAP device, the plurality of hybrid analog-digital repeater devices, and the one or more service WAP devices based on the determined one or more intra-node RF beam parameters and the one or more inter-node RF beam parameters;

causing the plurality of hybrid analog-digital repeater devices to establish one or more analog data propagation paths in the wireless backhaul mesh network in one or more intermediate frequencies; and causing the plurality of hybrid analog-digital repeater devices to establish a backchannel network in a control plane in the wireless backhaul mesh network via a wireless local area network (WLAN) frequency less than the one or more intermediate frequencies.

20. A computer program product for telemetry information-based network role reassignments, the computer pro-gram product comprising a non-transitory computer-readable storage medium having program instructions embodied therewith, the program instructions are executable by a system to cause the system to execute operations, the operations comprising:

obtaining a first type of telemetry information from a plurality of hybrid analog-digital repeater devices;

obtaining a second type of telemetry information from a master wireless access point (WAP) device and one or more service wireless access point devices;

determining one or more intra-node radio frequency (RF) beam parameters and one or more inter-node RF beam parameters for each of the plurality of hybrid analog-digital repeater devices based on the first type of telemetry information and the second type of telemetry information;

causing the plurality of hybrid analog-digital repeater devices to dynamically form a wireless backhaul mesh network among the master WAP device, the plurality of hybrid analog-digital repeater devices, and the one or more service WAP devices based on the determined one or more intra-node RF beam parameters and the one or more inter-node RF beam parameters;

causing the plurality of hybrid analog-digital repeater devices to establish one or more analog data propagation paths in the wireless backhaul mesh network in one or more intermediate frequencies; and causing the plurality of hybrid analog-digital repeater devices to establish a backchannel network in a control plane in the wireless backhaul mesh network via a wireless local area network (WLAN) frequency less than the one or more intermediate frequencies.

* * * * *